(12) United States Patent
Lee et al.

(10) Patent No.: US 11,870,922 B2
(45) Date of Patent: Jan. 9, 2024

(54) MOBILE TERMINAL AND ELECTRONIC DEVICE HAVING MOBILE TERMINAL

(71) Applicant: LG ELECTRONICS INC., Seoul (KR)

(72) Inventors: Jungbin Lee, Seoul (KR); Seongmi Kim, Seoul (KR); Byungkee Chae, Seoul (KR); Minhaeng Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/432,401

(22) PCT Filed: May 9, 2019

(86) PCT No.: PCT/KR2019/005597
§ 371 (c)(1),
(2) Date: Aug. 19, 2021

(87) PCT Pub. No.: WO2020/171287
PCT Pub. Date: Aug. 27, 2020

(65) Prior Publication Data
US 2022/0197581 A1 Jun. 23, 2022

Related U.S. Application Data

(60) Provisional application No. 62/807,257, filed on Feb. 19, 2019.

(51) Int. Cl.
*H04M 1/02* (2006.01)
*H04M 1/21* (2006.01)
(Continued)

(52) U.S. Cl.
CPC ........ *H04M 1/0214* (2013.01); *G06F 3/0488* (2013.01); *G06F 3/04817* (2013.01);
(Continued)

(58) Field of Classification Search
CPC .. G06F 3/1423; G06F 3/0488; G06F 3/04817; G06F 3/04847;
(Continued)

(56) References Cited

U.S. PATENT DOCUMENTS 1,086,694 A 2/1914 Winters
2005/0030255 A1 2/2005 Chiu et al.
(Continued)

FOREIGN PATENT DOCUMENTS

CN 103729160 A 4/2014
CN 104820549 A 8/2015
(Continued)

*Primary Examiner* — Sahlu Okebato
(74) *Attorney, Agent, or Firm* — Birch, Stewart, Kolasch & Birch, LLP

(57) ABSTRACT

A mobile terminal of an electronic device, according to the present invention, comprises a terminal body coupled to a case, and a first display unit coupled to the case, wherein the case comprises: a first body formed to accommodate at least a portion of the terminal body; a second body in which a second display unit is arranged; a wiring part electrically connecting the first body to the second body so that data received from the mobile terminal is transmitted to the second display unit; and a wireless communication unit connected to the wiring part so as to transmit/receive a signal to/from the mobile terminal. In addition, a control unit of the mobile terminal detects a state in which an execution screen of a first application is displayed on the first display unit and an execution screen of a second application is displayed on the second display unit, controls the execution screen of the first application according to a control signal corresponding to a touch signal of a first touch when the touch signal of the first touch applied to the execution screen of the first application is received, and transmits, when a touch signal of a second touch applied to the execution screen of the second application is received, a second control signal correspond- (Continued)

ing to the received touch signal of the second touch to the second display unit through the wireless communication unit and the wiring part so as to control the execution screen displayed on the second display unit.

16 Claims, 34 Drawing Sheets

(51) Int. Cl.
| | |
|---|---|
| *G06F 3/0488* | (2022.01) |
| *G06F 3/14* | (2006.01) |
| *H04B 1/3888* | (2015.01) |
| *G06F 3/04817* | (2022.01) |
| *G06F 3/04847* | (2022.01) |
| *H04N 9/73* | (2023.01) |
| *H04N 23/63* | (2023.01) |

(52) U.S. Cl.
CPC ........ *G06F 3/04847* (2013.01); *G06F 3/1423* (2013.01); *H04B 1/3888* (2013.01); *H04M 1/21* (2013.01); *H04N 9/73* (2013.01); *H04N 23/632* (2023.01); *H04M 2201/38* (2013.01)

(58) Field of Classification Search
CPC ......... G06F 2203/04803; G06F 1/1683; G06F 1/1698; G06F 1/26; G06F 3/0481; G06F 2200/1633; G06F 1/1626; G06F 1/1632; G06F 1/1647; G06F 1/1654; G06F 1/266; G06F 1/3265; G06F 1/3287; G06F 3/04883; G06F 3/1431; G06F 3/0483; G06F 9/50; H04B 1/3888; H04M 1/0214; H04M 1/21; H04M 2201/38; H04M 1/185; H04M 1/72409; H04M 1/72412; H04M 2250/16; H04N 9/73; H04N 23/632; G09G 2354/00
See application file for complete search history.

(56) References Cited

U.S. PATENT DOCUMENTS

| | | |
|---|---|---|
| 2008/0318636 A1 | 12/2008 | Kim |
| 2011/0060988 A1 | 3/2011 | Mysliwy et al. |
| 2012/0117290 A1* | 5/2012 | Sirpal ................... G06F 1/1654 710/110 |
| 2013/0300687 A1 | 11/2013 | Park |
| 2014/0101535 A1* | 4/2014 | Kim .................... G06F 3/04886 715/761 |
| 2014/0101577 A1 | 4/2014 | Kwak et al. |
| 2014/0101579 A1 | 4/2014 | Kim et al. |
| 2014/0184471 A1* | 7/2014 | Martynov ............. G06F 3/1423 345/1.2 |
| 2014/0375596 A1* | 12/2014 | Kim ...................... G06F 1/1652 345/173 |
| 2015/0012830 A1* | 1/2015 | Choi ................... G06F 3/04842 715/765 |
| 2016/0103603 A1 | 4/2016 | Sirpal et al. |
| 2016/0301150 A1 | 10/2016 | Choi et al. |
| 2017/0285906 A1 | 10/2017 | Kim et al. |
| 2018/0011676 A1* | 1/2018 | Han ........................ G06F 3/013 |
| 2018/0260368 A1 | 9/2018 | Vagell et al. |
| 2019/0342440 A1* | 11/2019 | Coverstone ....... H04M 1/72409 |

FOREIGN PATENT DOCUMENTS

| | | |
|---|---|---|
| CN | 105141801 A | 12/2015 |
| CN | 105933544 A | 9/2016 |
| CN | 108897486 A | 11/2016 |
| CN | 106372473 A | 2/2017 |
| CN | 106529310 A | 3/2017 |
| CN | 106993099 A | 7/2017 |
| CN | 107463310 A | 12/2017 |
| CN | 108279836 A | 7/2018 |
| EP | 2442240 A1 | 4/2012 |
| JP | 2018-37079 A | 3/2018 |
| KR | 10-2009-0132140 A | 12/2009 |
| KR | 10-2010-0030387 A | 3/2010 |
| KR | 10-2011-0060298 A | 6/2011 |
| KR | 10-2012-0092036 A | 8/2012 |
| KR | 10-2014-0046319 A | 4/2014 |
| KR | 10-2014-0046345 A | 4/2014 |
| KR | 10-2014-0136771 A | 12/2014 |
| KR | 10-2016-0036736 A | 4/2016 |
| KR | 10-2016-0076760 A | 6/2016 |
| KR | 10-2016-0096731 A | 8/2016 |
| KR | 10-1737927 B1 | 5/2017 |
| KR | 10-2018-0061059 A | 6/2018 |

\* cited by examiner

FIG. 1B
(a) 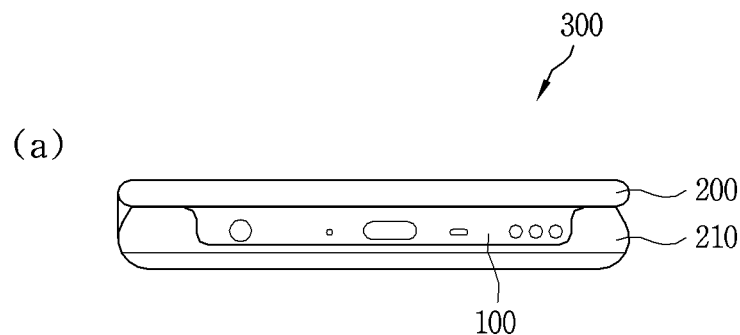
(b) 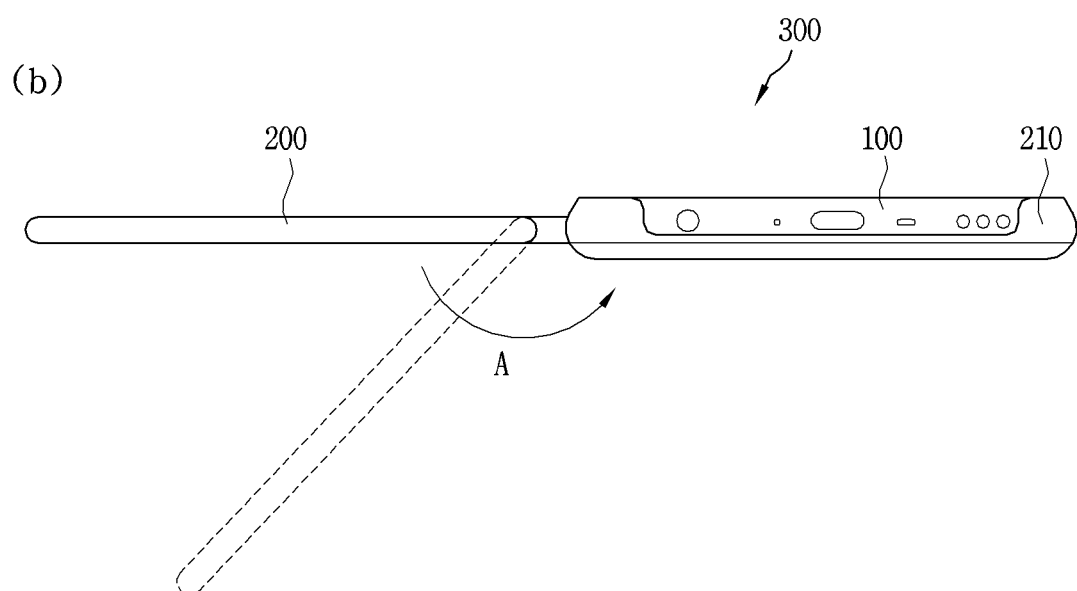
(c) 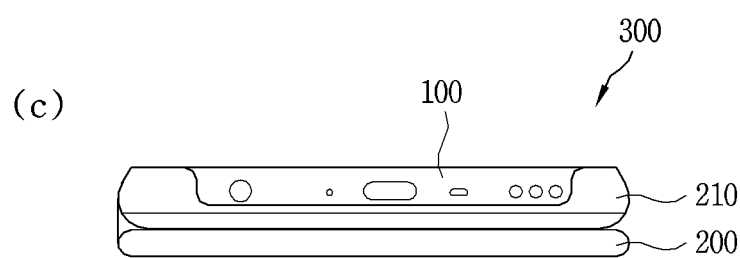

FIG. 5B
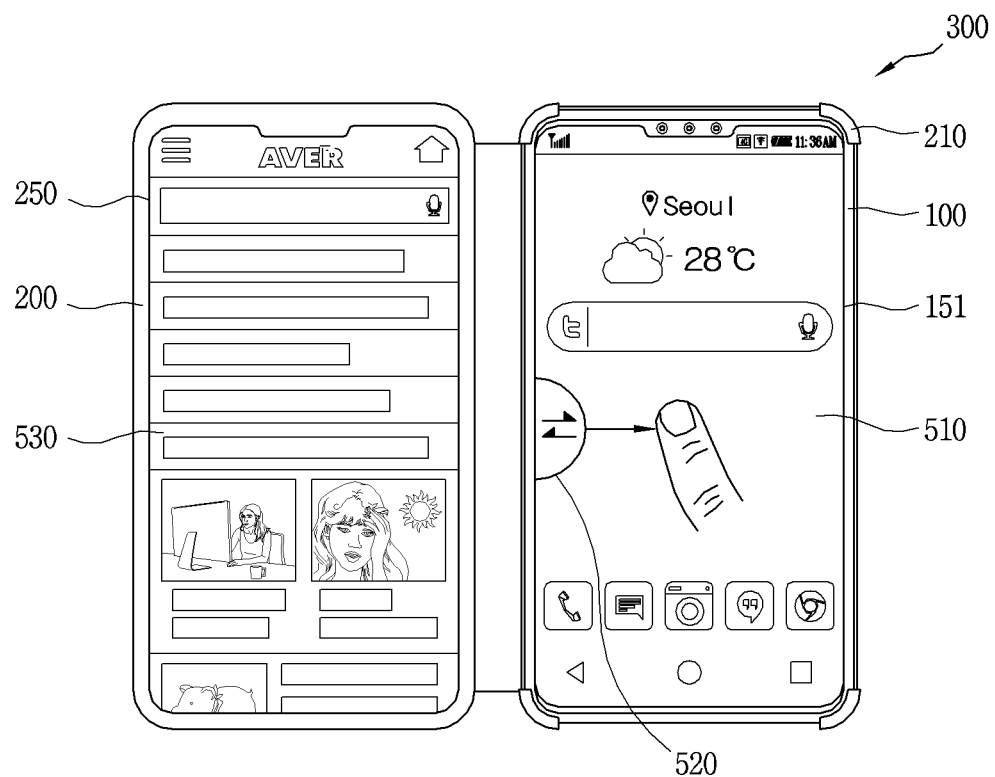

FIG. 5C
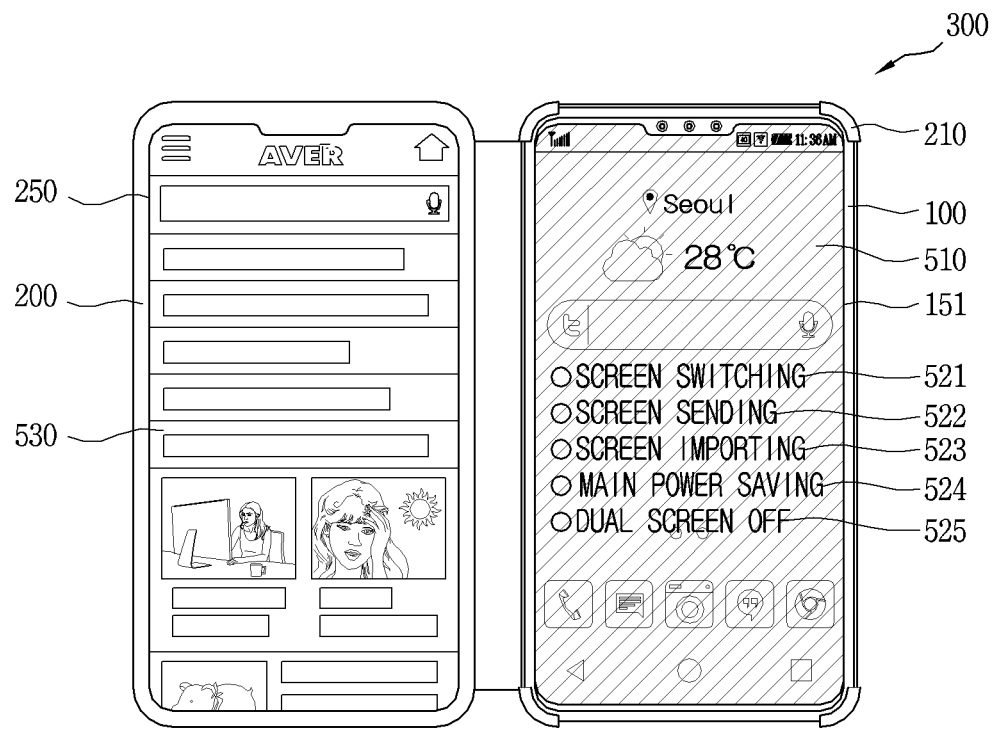
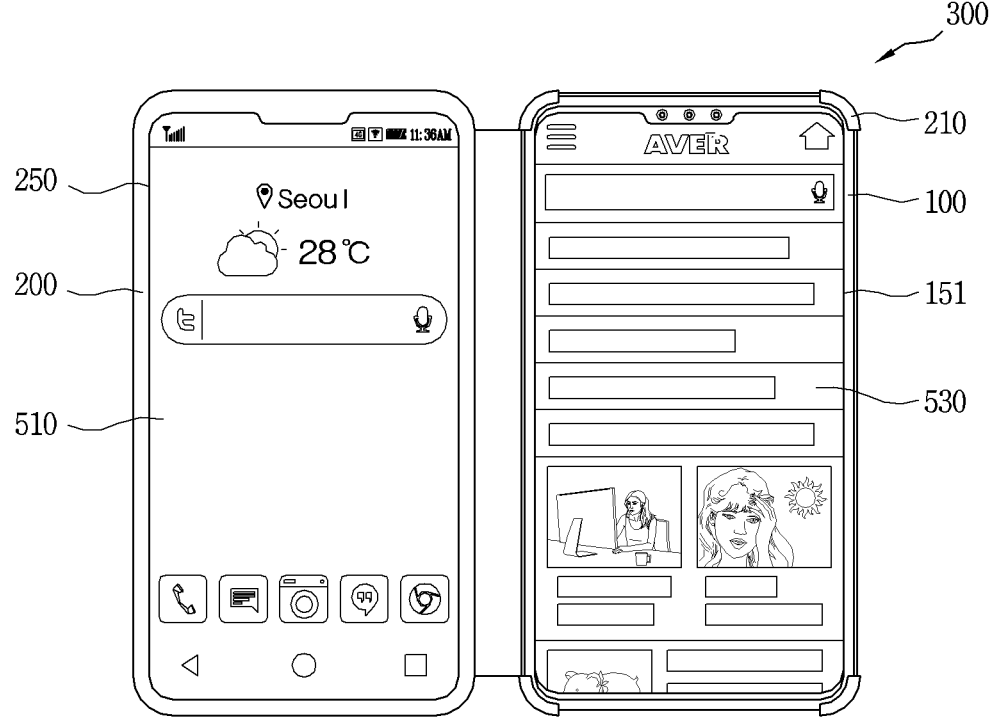

FIG. 5D
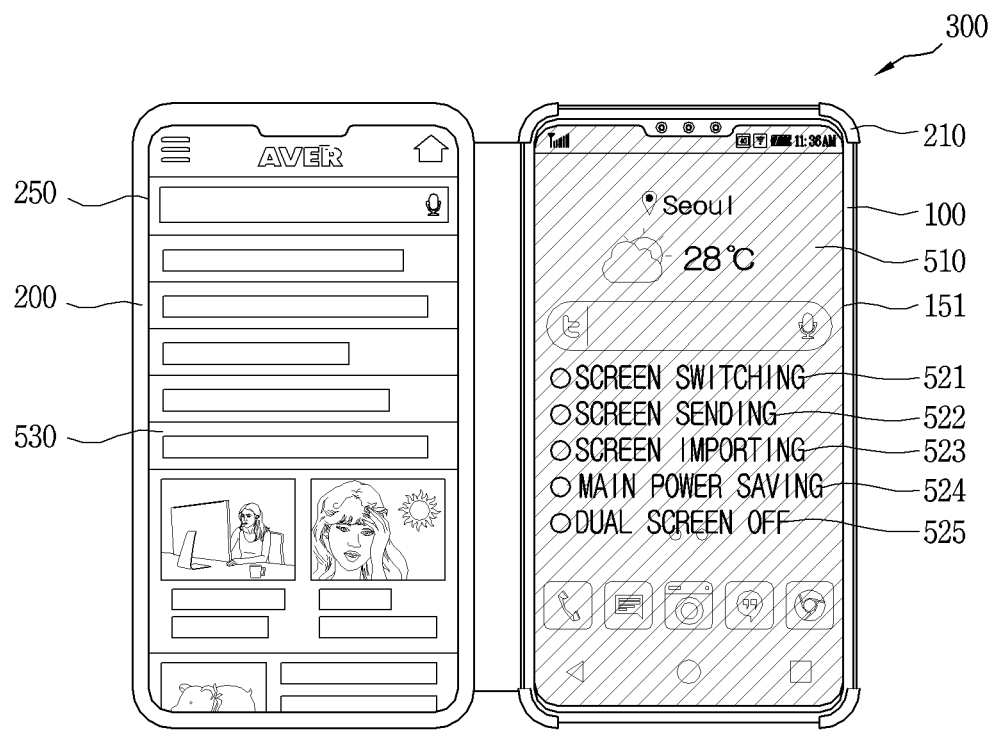
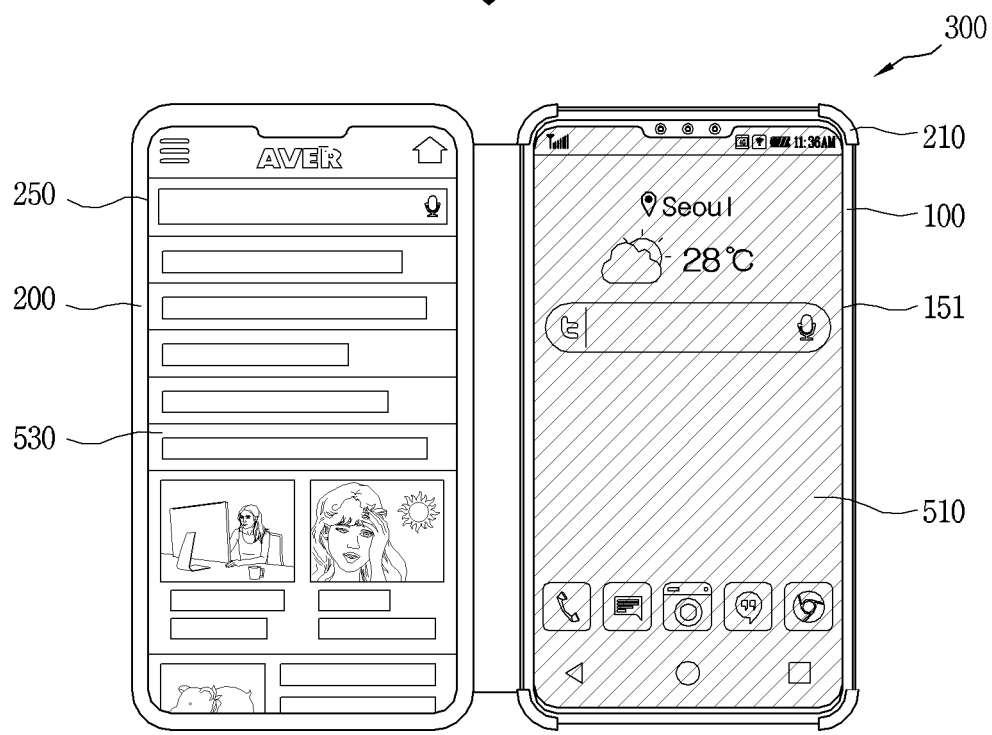

FIG. 5E
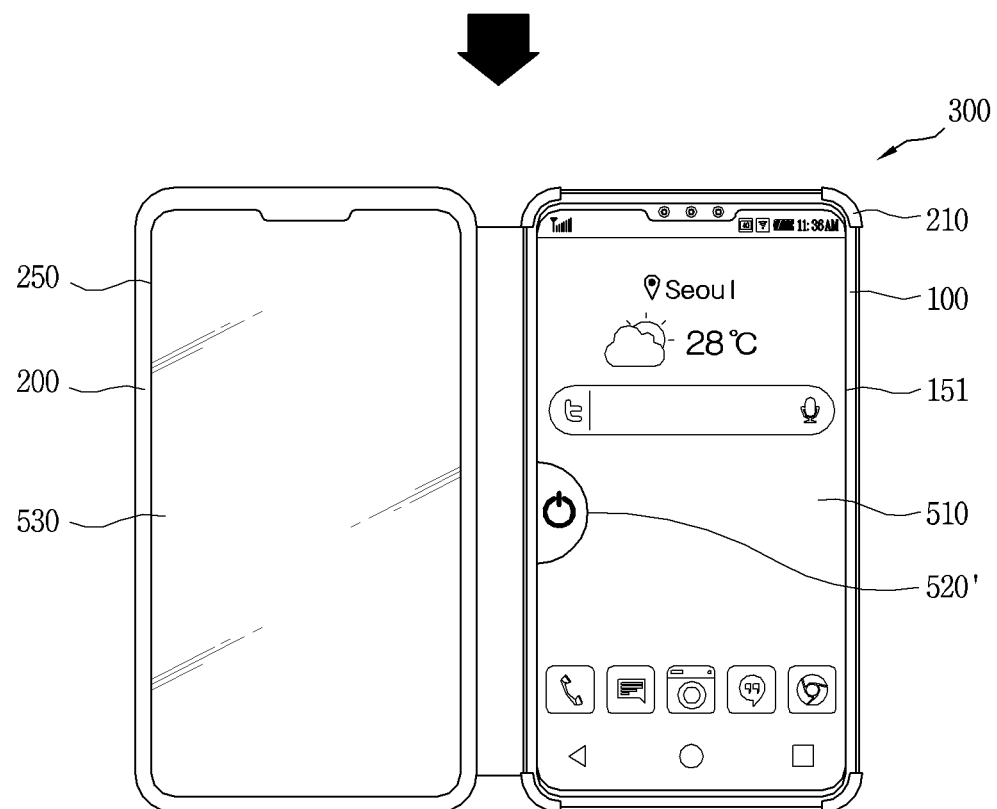

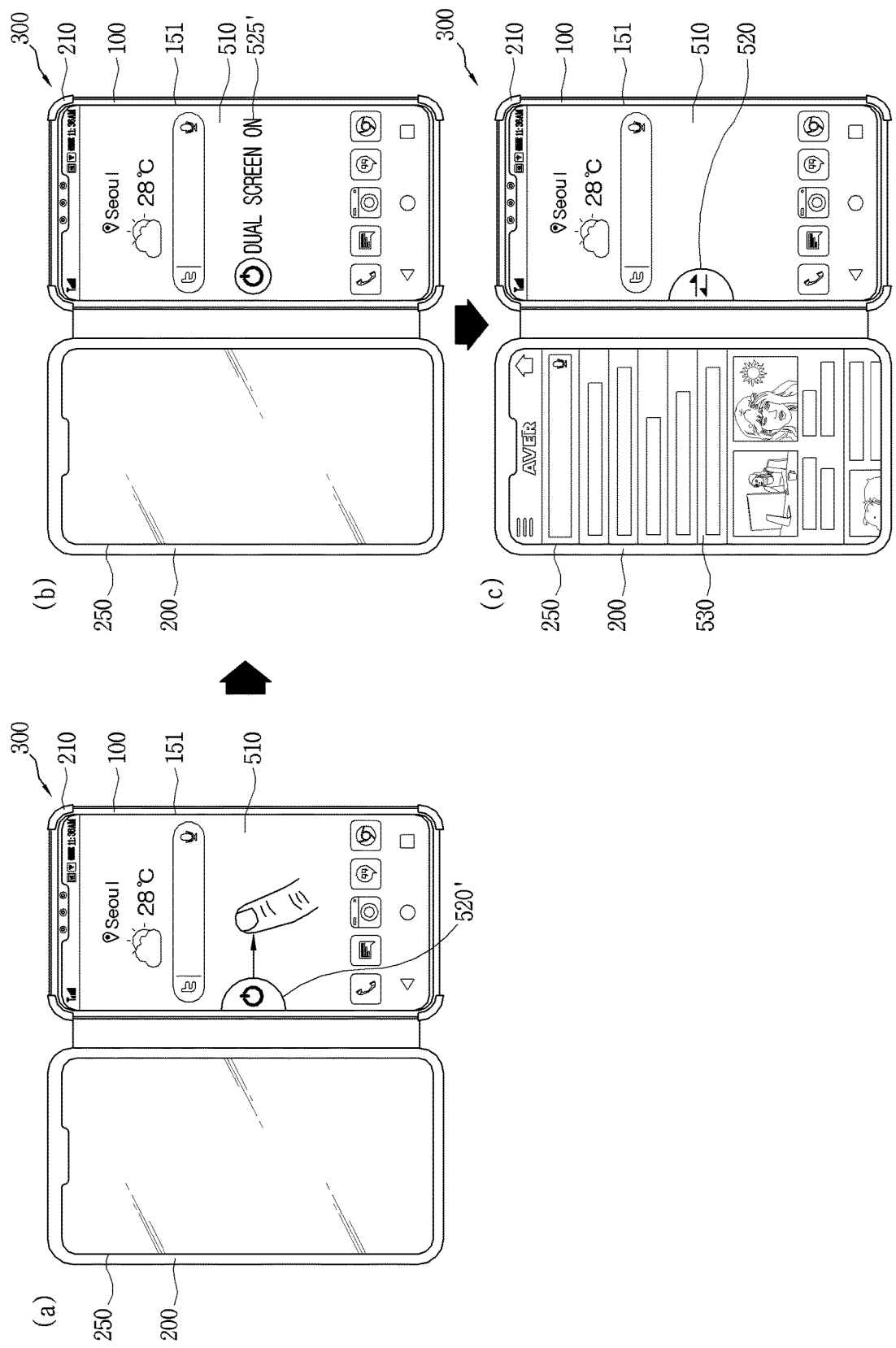

FIG. 5G
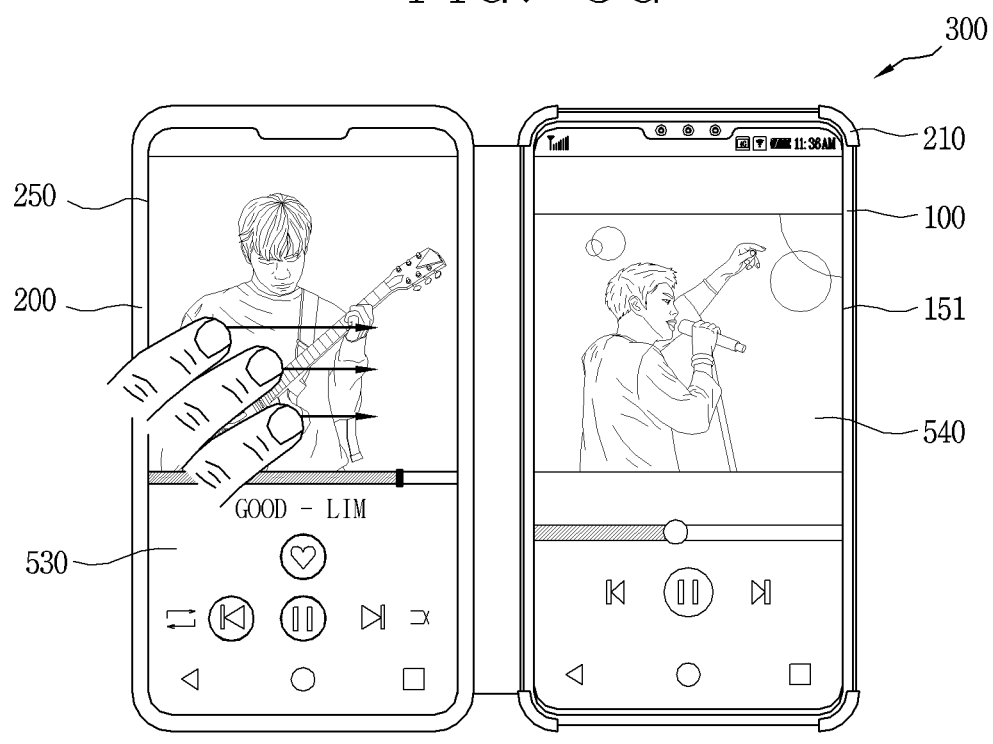
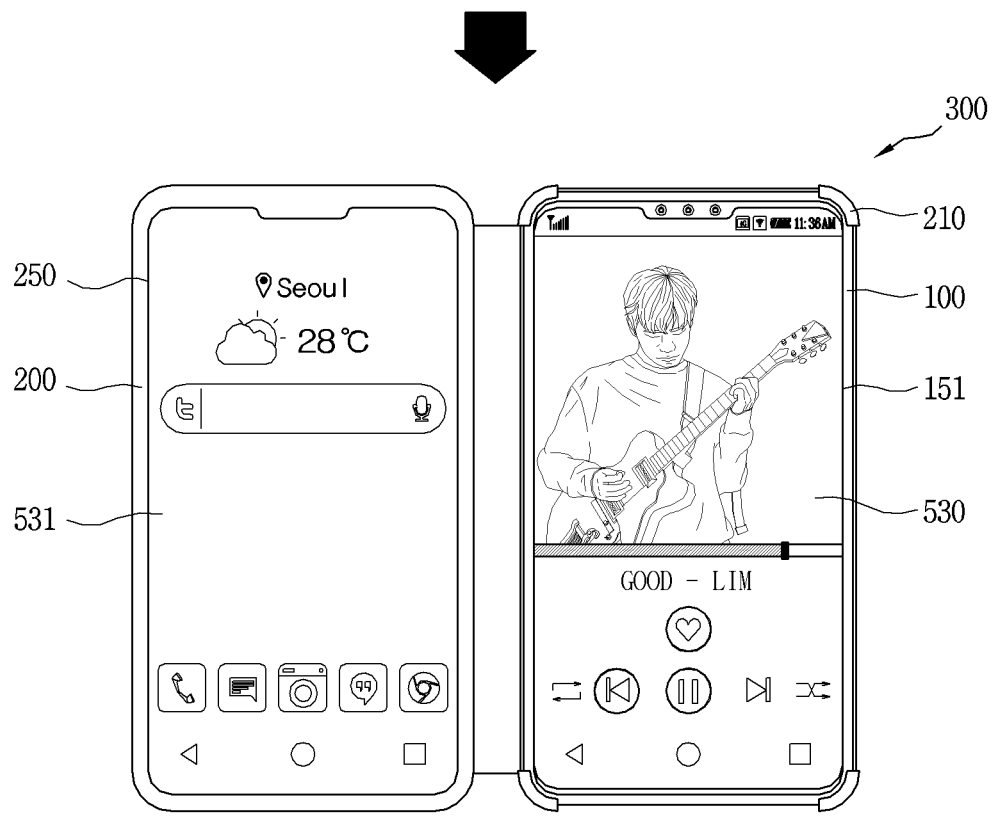

FIG. 5H
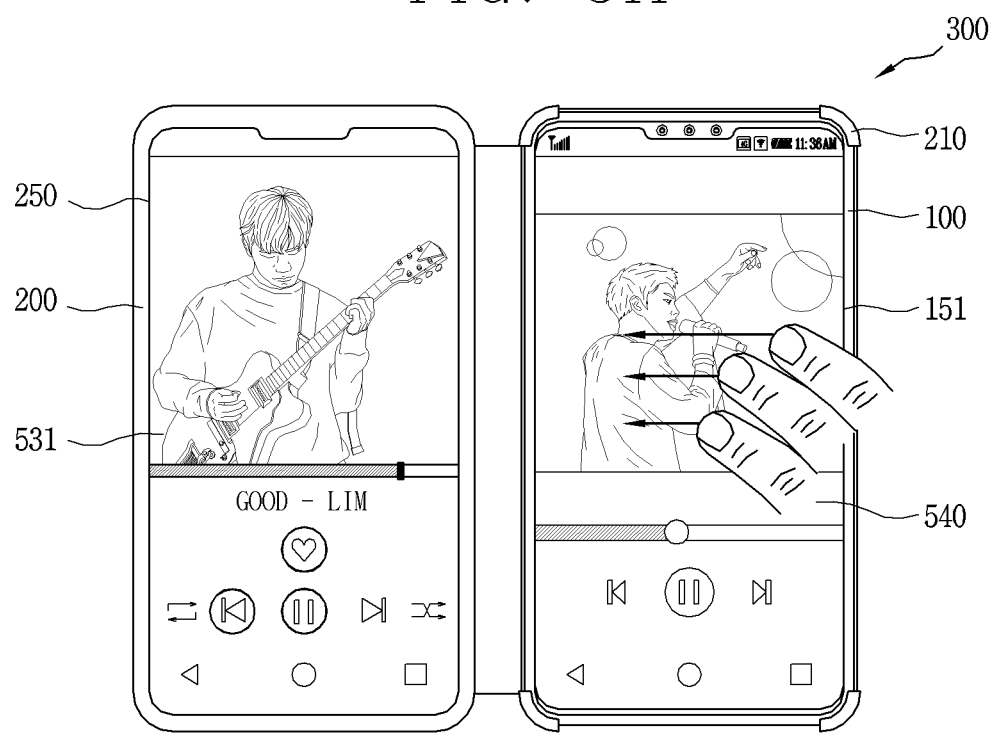
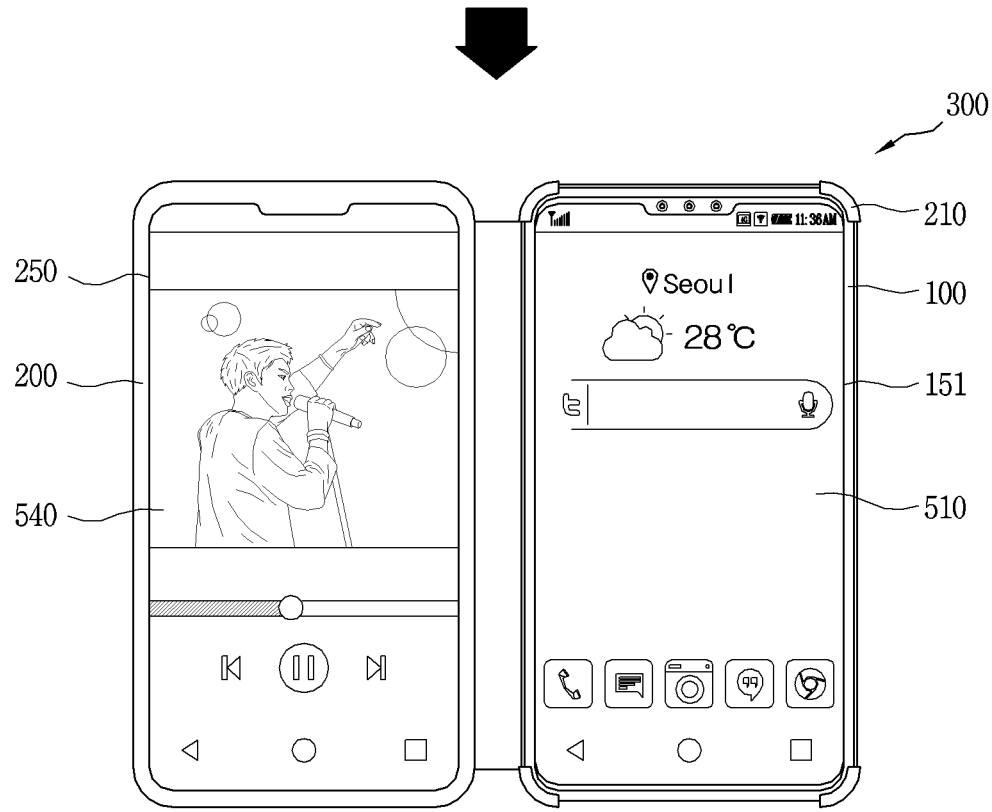

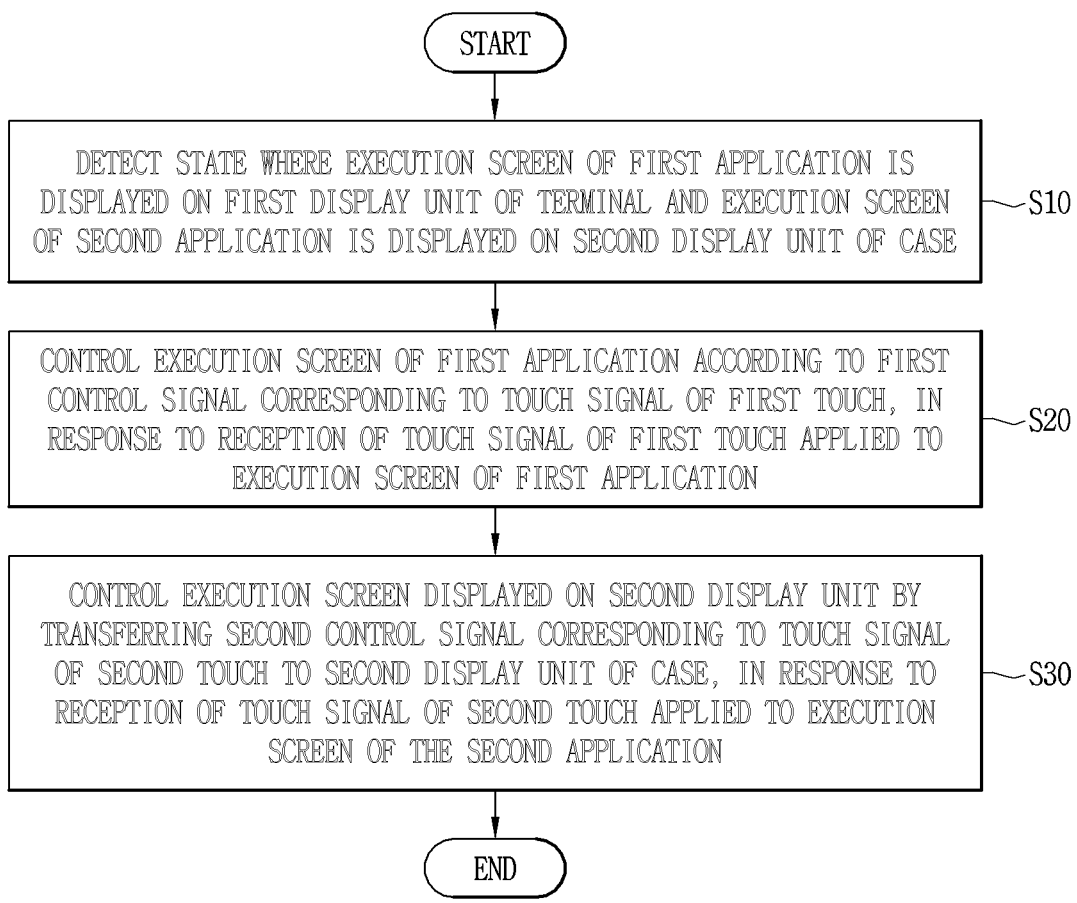

FIG. 8I
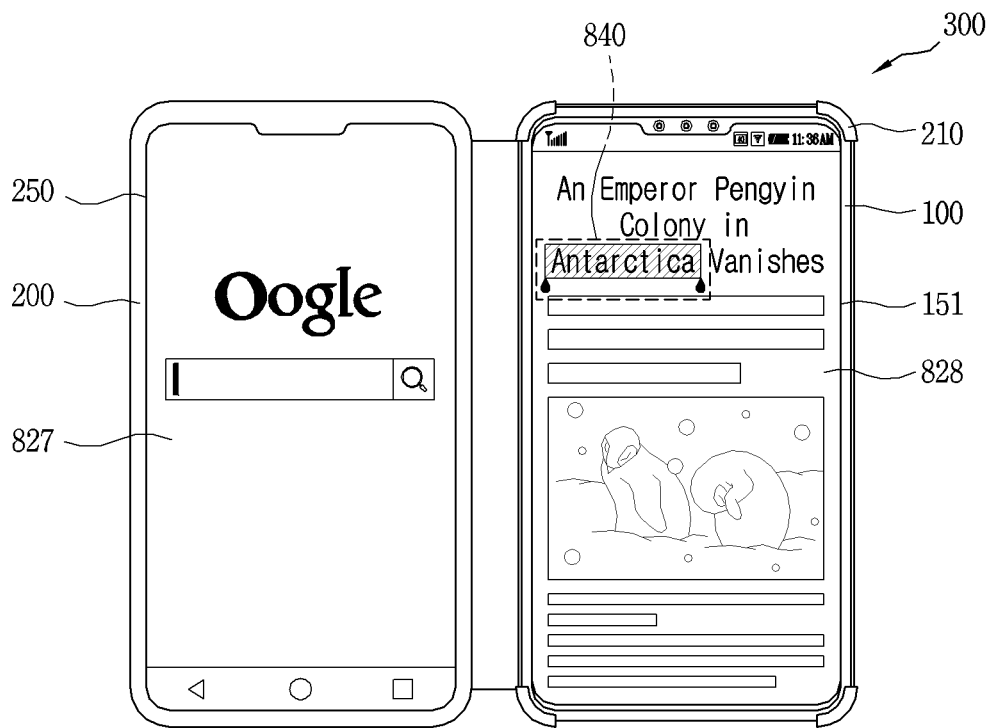

MOBILE TERMINAL AND ELECTRONIC DEVICE HAVING MOBILE TERMINAL

CROSS REFERENCE TO RELATED APPLICATIONS

This application is the National Phase of PCT International Application No. PCT/KR2019/005597, filed on May 9, 2019, which claims priority under 35 U.S.C. 119(e) to U.S. Provisional Application No. 62/807,257, filed on Feb. 19, 2019, all of which are hereby expressly incorporated by reference into the present application.

TECHNICAL FIELD

The present disclosure relates to a mobile terminal, an electronic device having a case coupled to the mobile terminal, and a method for controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Meanwhile, in recent years, there is a trend to further expand the usability of a mobile terminal by interoperating with an external device, so as to more efficiently utilize such various functions. In this case, the mobile terminal and the external device interoperating with the mobile terminal may preferably operate independently or interoperably as needed to improve user convenience and usability.

DISCLOSURE

Technical Problem

One aspect of the present disclosure is to provide a mobile terminal capable of expanding a display area by coupling a case having an additional display unit interoperating with the mobile terminal to the mobile terminal, and an electronic device having the case to which the mobile terminal is coupled.

Another aspect of the present disclosure is to provide a mobile terminal capable of displaying execution screens of different applications on a plurality of display areas and independently controlling the screens using a single control mechanism, and simultaneously checking associated screen information, and an electronic device having a case to which the mobile terminal is coupled.

Still another aspect of the present disclosure is to provide a mobile terminal capable of setting one background screen to be expanded across a plurality of independent display areas, and setting a screen desired by a user to an initial state screen of at least one display area, and an electronic device having a case to which the mobile terminal is coupled.

Technical Solution

Therefore, in order to achieve these and other advantages and in accordance with the purpose of this specification, as embodied and broadly described herein, there is provided an electronic device including a mobile terminal and a case to which the mobile terminal is coupled, and the mobile terminal may include a terminal body coupled to the case, and a first display unit coupled to the case, and the case may include a first body to accommodate at least a portion of the terminal body, a second body on which a second display unit is disposed, a wiring part electrically connecting the first body and the second body to transmit data received from the mobile terminal to the second display unit, and a wireless communication unit connected to the wiring part to transmit and receive signals to and from the mobile terminal. A control unit of the mobile terminal may be configured to detect a state in which an execution screen of a first application is displayed on the first display unit, and an execution screen of a second application is displayed on the second display unit, control, when a touch signal of a first touch applied to the execution screen of the first application is received, the execution screen of the first application according to a control signal corresponding to the touch signal of the first touch, and control, when a touch signal of a second touch applied to the execution screen of the second application is received, the execution screen displayed on the second display unit by transmitting a second control signal corresponding to the received touch signal of the second touch to the second display unit through the wireless communication unit and the wiring part.

In one implementation, the first and second display units may have one of a closed state in which the first display unit is covered by the second display unit and an open state in which the first display unit is not covered by the second display unit, and a control unit of the mobile terminal may be configured to detect that the closed state is switched to the open state according to a relative rotation of the first body and the second body, and switch both the first and second display units from an inactive state to an active state.

In one implementation, the first and second display units may display different home screens when the first and second display units are switched to the active state, and the first and second execution screens may be displayed based on a touch input applied to each displayed home screen.

In one implementation, the control unit of the mobile terminal may be configured to output notification information notifying that the first application is not allowed to be executed on the second display unit while maintaining a display state of the first display unit, in response to a detection of a request for an execution of the first application on the second display unit in a state in which the execution screen of the first application is displayed on the first display unit.

In one implementation, the control unit may be configured to allocate different memory stacks for tasks of the respective execution screens displayed on the first and second display units, and control each memory stack to maintain the task of the execution screen of the second application displayed on the second display while changing the task of the execution screen of the first application according to the control signal corresponding to the touch signal of the first touch.

In one implementation, the control unit of the mobile terminal may be configured to recognize information selected on the execution screen of the first application according to the first touch, and display the recognized information by inserting the same in the input area displayed on the second display unit when the second touch is applied after the first touch to an input area included in the execution screen of the second application displayed on the second display unit.

In one implementation, a search result related to the recognized information may be output to the second display unit in response to the recognized information being displayed on the input area displayed on the second display unit.

In one implementation, the control unit of the mobile terminal may be configured to, when a selection of a specific wallpaper is detected while a third execution screen for setting a wallpaper is displayed on one of the first display unit and the second display unit, display the third execution screen setting information for applying the selected wallpaper to be expanded to another display unit on the third execution screen, and change wallpaper settings of the first and second display units, in response to an input to the setting information, so that the selected wallpaper is displayed across the first and second display units.

In one implementation, the control unit of the mobile terminal may apply the selected wallpaper only to the one display unit when the selected wallpaper is not allowed to be expanded to the another display unit or the input to the setting information is negative.

In one implementation, the first and second display units may have one of a closed state in which the first display unit is covered by the second display unit and an open state in which the first display unit is not covered by the second display unit, and a control unit of the mobile terminal may be configured to set an execution screen in an initial state for the second display unit to store as setting information of the second display unit, display a home screen on the first display unit when it is detected that the closed state is switched to the open state in response to the relative rotation of the first body and the second body, and control the second display unit to display an execution screen of an application according to the stored setting information.

In one implementation, the electronic device may further include a connecting portion configured to allow the first body and the second body to rotate relative to each other, and a control unit of the mobile terminal may be configured to determine whether to activate the second display unit and to display the execution screen of the application according to the stored setting information, according to a rotation angle of the connecting portion detected in the open state.

In one implementation, the first and second display units may have one of a closed state in which the first display unit is covered by the second display unit and an open state in which the first display unit is not covered by the second display unit, and a control unit of the mobile terminal may be configured to control a display direction of at least one of the first and second display units to be rotated in a direction corresponding to the bent state when the first body and the second body relatively rotate toward the rear surface of the case in the open state so that the open state is switched from the open state to the bent state.

Also, in order to achieve these and other advantages and in accordance with the purpose of this specification, as embodied and broadly described herein, there is provided a method for controlling an electronic device including a mobile terminal and a case to which the mobile terminal is coupled. Here, the mobile terminal may include a first display unit and the case may include a first body to accommodate the mobile terminal and a second body on which a second display unit is disposed. The method may include detecting a state in which an execution screen of a first application is displayed on the first display unit, and an execution screen of a second application is displayed on the second display unit, controlling, when a touch signal of a first touch applied to the execution screen of the first application is received, the execution screen of the first application according to a control signal corresponding to the touch signal of the first touch, and control, when a touch signal of a second touch applied to the execution screen of the second application is received, the execution screen displayed on the second display unit by transmitting a second control signal corresponding to the received touch signal of the second touch to the second display unit.

In one implementation, the method may further include displaying a third execution screen for setting a wallpaper on either the first display unit or the second display unit, displaying the third execution screen setting information for applying a selected specific wallpaper to be expanded to another display unit on the third execution screen when the selection of the specific wallpaper is detected, and displaying the selected wallpaper across the first and second display units based on an input to the setting information.

In one implementation, the method may further include setting an execution screen in an initial state for the second display unit to store as setting information for the second display unit, detecting that a closed state in which the mobile terminal is closed with being coupled to the case is switched to an open state in response to relative rotation of the first body and the second body, and deactivating both the first and second display units in response to the closed state being switched to the open state, and outputting a home screen on the first display unit while outputting the second execution screen corresponding to an execution of an application according to the stored setting information on the second display unit.

Advantageous Effects

As described above, in a mobile terminal and an electronic device having the mobile terminal according to the present disclosure, different screens displayed on a plurality of display areas can be independently controlled, and related screens can be simultaneously checked if necessary. A background screen set in one display area can be expanded to be connected to another display area. When the electronic device according to the present disclosure is switched from a closed state to an open state, a second display unit provided on a case can be set to output a screen desired by a user as an initial state screen. Accordingly, the user experience of the electronic device including the mobile terminal and the case coupled to the mobile terminal can be expanded, and usability can thusly be improved.

BRIEF DESCRIPTION OF THE DRAWINGS

FIGS. 1A and 1B are conceptual views illustrating an electronic device in accordance with the present disclosure.

FIGS. 5A to 5H are conceptual views illustrating various implementations of a method for controlling screens of a plurality of display units using a first display unit provided on a mobile terminal, in an electronic device in accordance with the present disclosure.

FIG. 6 is a representative flowchart illustrating an operation process of a control method in an electronic device according to the present disclosure.

FIGS. 8A, 8B, 8C, 8D, 8E, 8F, 8G, 8H, and 8I are diagrams illustrating various examples in which different applications are executed on a first display unit and a second display unit, in an electronic device according to the present disclosure.

MODES FOR CARRYING OUT THE
PREFERRED IMPLEMENTATIONS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
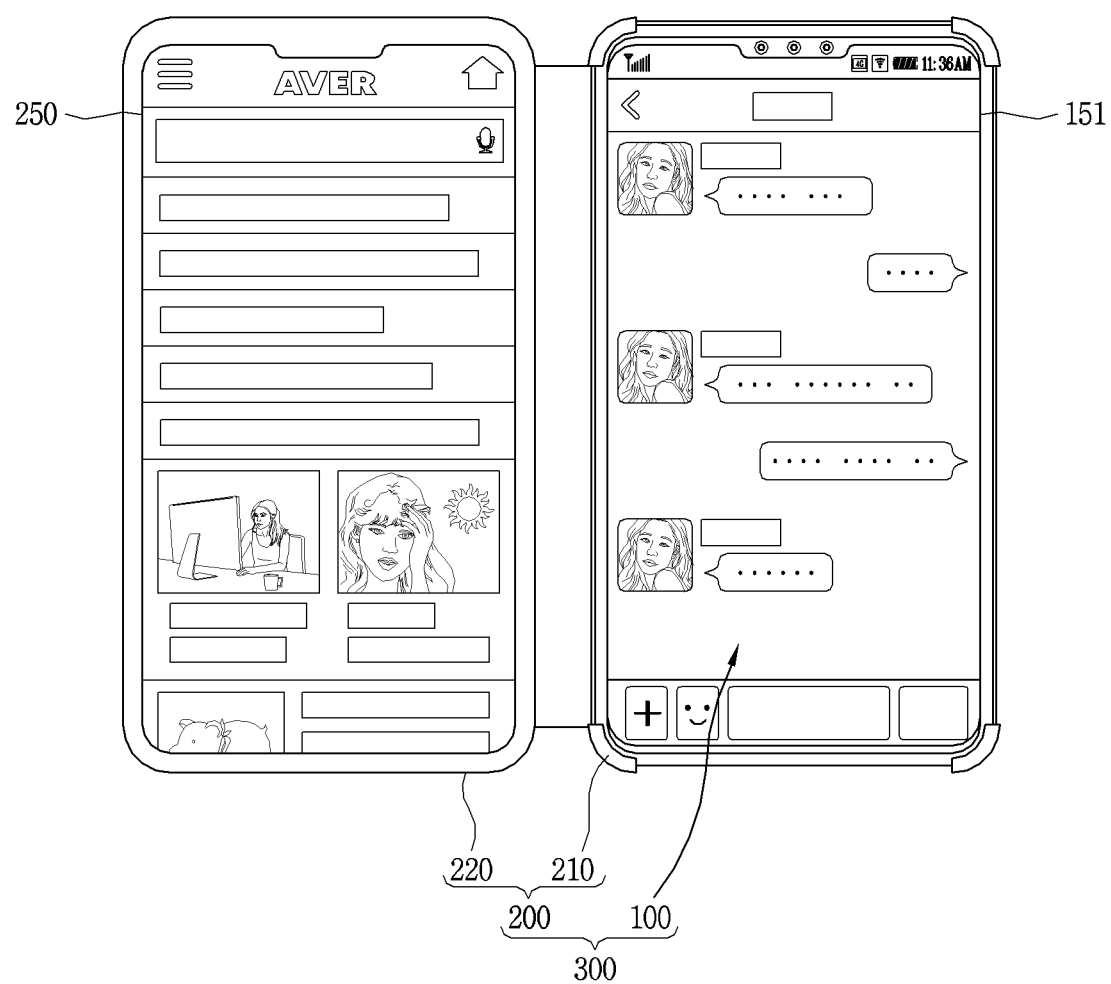

FIGS. 1A and 1B are conceptual views illustrating an electronic device according to the present disclosure.

Referring to the drawings, a mobile terminal 100 may be coupled to a case 200. The mobile terminal 100 and the case 200 may be coupled to configure one electronic device 300.

In this case, the mobile terminal may be one of a cellular phone, a smart phone, a laptop computer, a digital broadcast terminal, a personal digital assistant (PDA), a portable multimedia player (PMP), a navigator, a slate PC, a tablet PC, a ultra book, and a wearable device (for example, a smart watch, smart glass, a head mounted display (HMD), and the like). Details of the mobile terminal will be described later with reference to FIGS. 3A to 3C.

The case 200 may be a pouch that protects an outer appearance of the mobile terminal 100 or is provided as an accessory of the mobile terminal 100 to cover or accommodate at least one surface of the mobile terminal 100. The case 200 may be coupled to the mobile terminal to extend the function of the mobile terminal 100.

Meanwhile, in the present disclosure, information output from the mobile terminal may be processed in connection with the structure or function of the case 200. As an example of this, referring to FIG. 1A, the case 200 may include a display (or display unit) (hereinafter, referred to as "second display unit 250") interoperating with a display (hereinafter, referred to as "first display unit 151") of the mobile terminal 100.

The case 200 may include first and second bodies 210 and 220 connected to be rotatable relative to each other. The second display unit 250 may be disposed on one of the first and second bodies 210 and 220.

For example, the first body 210 may accommodate at least a portion of the mobile terminal body. A rear side of the mobile terminal may be accommodated in the first body 210, and accordingly the first display unit 151 disposed on a front side of the mobile terminal may be externally exposed.

In this case, the mobile terminal 100 may be detachably coupled to the first body 210. In addition, the mobile terminal may be configured to detect whether it is coupled to the first body 210. For the detection, the first body 210 may include a magnet 245 (see FIG. 4) on one surface facing the mobile terminal 100. The mobile terminal 100 may include a hall sensor 143 (see FIG. 4) disposed on its rear side to sense a magnetic field corresponding to the magnet 245 when the body of the mobile terminal is coupled to the first body 210. When the magnetic field is sensed by the hall sensor, the mobile terminal may recognize that it has been coupled to the case and perform a preset control.

For example, when the magnetic field is sensed by the hall sensor 143, a control unit 180 of the mobile terminal 100 may control a power supply unit 190 to supply an operating current to the second display unit 250 disposed on the second body 220.

That is, the second display unit 250 provided on the second body 220 may be operated by power supplied from the mobile terminal 100.

On the other hand, the second display unit 250 may be disposed on the second body 220 to perform a function of expanding a display area of the first display unit 151 or to operate independent of the first display unit 151. For example, contents related to information output on the first display unit 151 may be mirrored to be output on the second display unit 250.

In addition, execution screens of different applications may be output to the first and second display units 151 and 250. As another example, the first and second display units 151 and 250 may output an execution screen of one application to divided areas.

Meanwhile, the first and second display units 151 and 250 may be externally exposed together in an open state, and the open state may be defined with reference to FIG. 1B.

In addition, the mobile terminal 100 may be configured to control screen information output to the second display unit 250, and for this purpose, at least one of wired and wireless communication links may be established between the mobile terminal 100 and the second display unit 250.

In addition, the mobile terminal 100 may be configured to supply an operating current to the second display unit 250. The operating current may be supplied from the mobile terminal 100 to the second display unit 250 through a wire provided in the case 200.

Referring to FIG. 1B, the first and second bodies 210 and 220 of the case 200 may rotate relative to each other between a closed state and a fully opened state.

The closed state may be a state shown in (a) of FIG. 1B, in which the first body 210 of the case 200 covers the first display unit 151 of the mobile terminal 100 and the first display unit 151 is obscured by the first body 210. That is, the state in which the first display unit 151 is covered by the second display unit 250 may be the closed state. In the closed state, the mobile terminal 100 and the case 200 may overlap each other in the form like a diary in a thickness direction of the mobile terminal, which may enhance user's portability.

Also, in this case, front surfaces of the first and second display units 151 and 250 may face each other. The front surfaces may be outer surfaces that display visual information and receive touch inputs.

The closed state may be switched to the open state as the second body 220 is rotated with respect to the first body 210. The open state may be a state in which the first display unit 151 is not covered by the second display unit 250, and thus a state in which an angle formed between the first and second display units 151 and 250 is a specific angle other than 0 degree may be referred to as the open state.

(b) of FIG. 1B illustrates an open state in which the first and second display units 151 and 250 form 180 degrees with each other. The foregoing example of FIG. 1A illustrates the state in which the first and second display units 151 and 250 form 180 degrees with each other. In addition, in the open state, the first and second bodies 210 and 220 may be fixed at a specific angle, and for this purpose, a fixing member may be provided in the case 220.

As illustrated in (b) of FIG. 1B, the first and second bodies 210 and 220 may further rotate relative to each other in a direction A. Accordingly, as illustrated in (c) of FIG. 1B, the first and second bodies 210 and 220 can relatively rotate up to 360 degrees. This open state may be defined as a 'fully open state'.

In addition, when the first and second bodies 210 and 220 relatively rotate within a range that is greater than 180 degrees and less than 360 degrees, this open state may be defined as a "bent state". The "bent state" in which the first body 210 is bent toward the rear side of the case may be detected through a connecting portion for connecting the first and second bodies 210 and 220 or a sensor separately provided in the connecting portion.

In this case, the first and second bodies 210 and 220 are superimposed on each other, and the first and second display units 151 and 250 may face outward, respectively. That is, the first and second display units 151 and 250 may face opposite directions.

Meanwhile, the mobile terminal may be configured to detect the closed state and the open state. In a related example, the mobile terminal may include a light sensor for sensing ambient illuminance, and the control unit 180 of the mobile terminal 100 may detect one of the closed state and the open state according to the illuminance sensed by the light sensor.

The control unit 180 may also separately detect a fully open state from among the open states.

The electronic device 300 of the present disclosure may perform an operation of controlling the first and second display units 151 and 250 in cooperation with the open state and the closed state. For example, in the closed state, the first and second display units 151 and 250 may be driven in an inactive state. When the closed state is switched to the open state, at least one of the first and second display units 151 and 250 may be activated.

As an example, when the closed state is switched to the open state, both the first display unit 151 and the second display unit 250 may be switched to an active state. In this case, different home screen pages may be respectively output to the first and second display units 151 and 250, or the same home screen page may be displayed all over the first and second display units 151 and 250. In addition, various information may be output to the first and second display units 151 and 250 according to circumstances.

As another example, when the closed state is switched to the open state, the first display unit 151 may be switched to an active state and the second display unit 250 may be maintained in an inactive state.

The second display unit 250 may include a touch sensor for sensing a touch applied to the second display unit 250.

The second display unit 250 may be configured to sense a touch even in the inactive state.

In relation to touch sensing of the touch sensor, the second display unit 250 may be switched to the active state in the open state when a touch applied to the second display unit 250 corresponds to a preset type of touch (preset touch).

Meanwhile, when a touch is applied to the second display unit 250, the second display unit 250 may transmit a touch signal corresponding to the touch to the mobile terminal 100. In addition, when the touch according to the received touch signal corresponds to a preset touch, the mobile terminal 100 may transmit a signal corresponding to a control command for activating the second display unit 250 to the second display unit 250.

Then, the second display unit 250 may be activated based on the signal received from the mobile terminal 100.

Meanwhile, in order to implement the operation of the electronic device described above, the case may have a new structure. Hereinafter, such a structure of the case will be described in more detail.

Figure 2A:
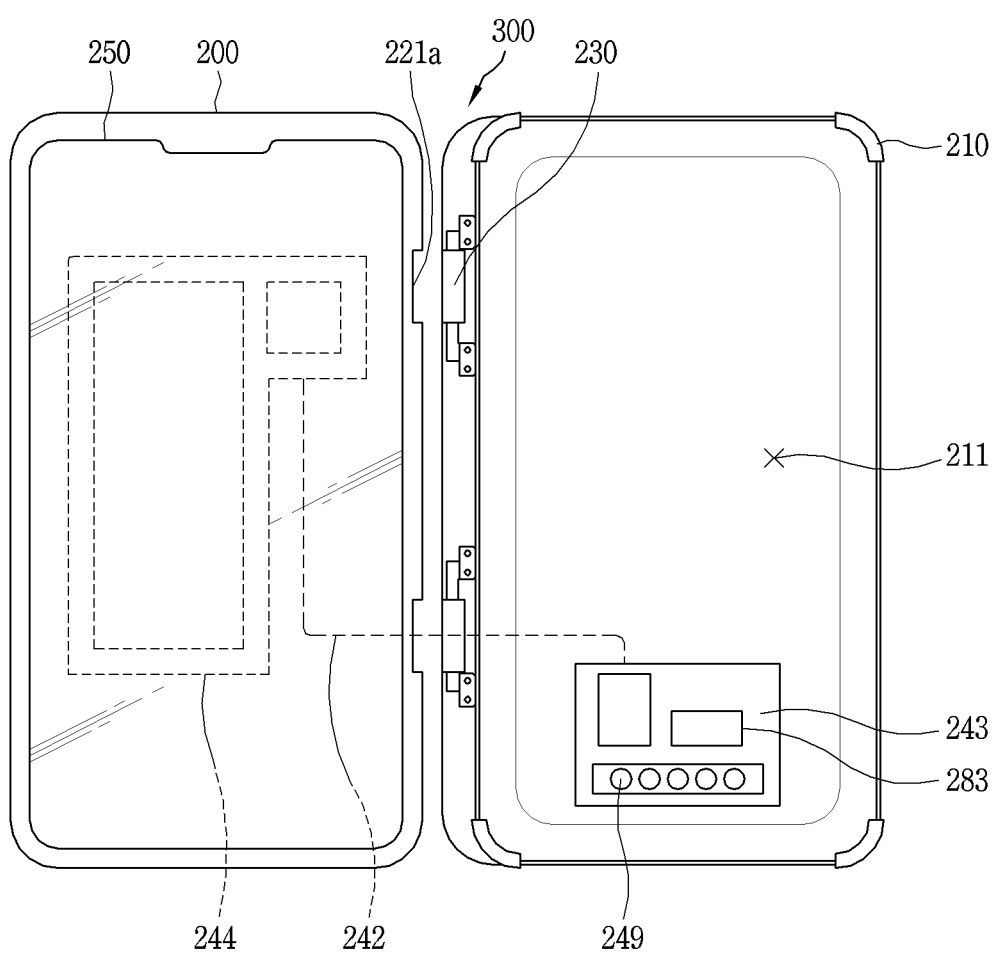
FIGS. 2A, 2B, and 2C are conceptual views illustrating a main structure of an electronic device in accordance with the present disclosure.
Figure 2B:
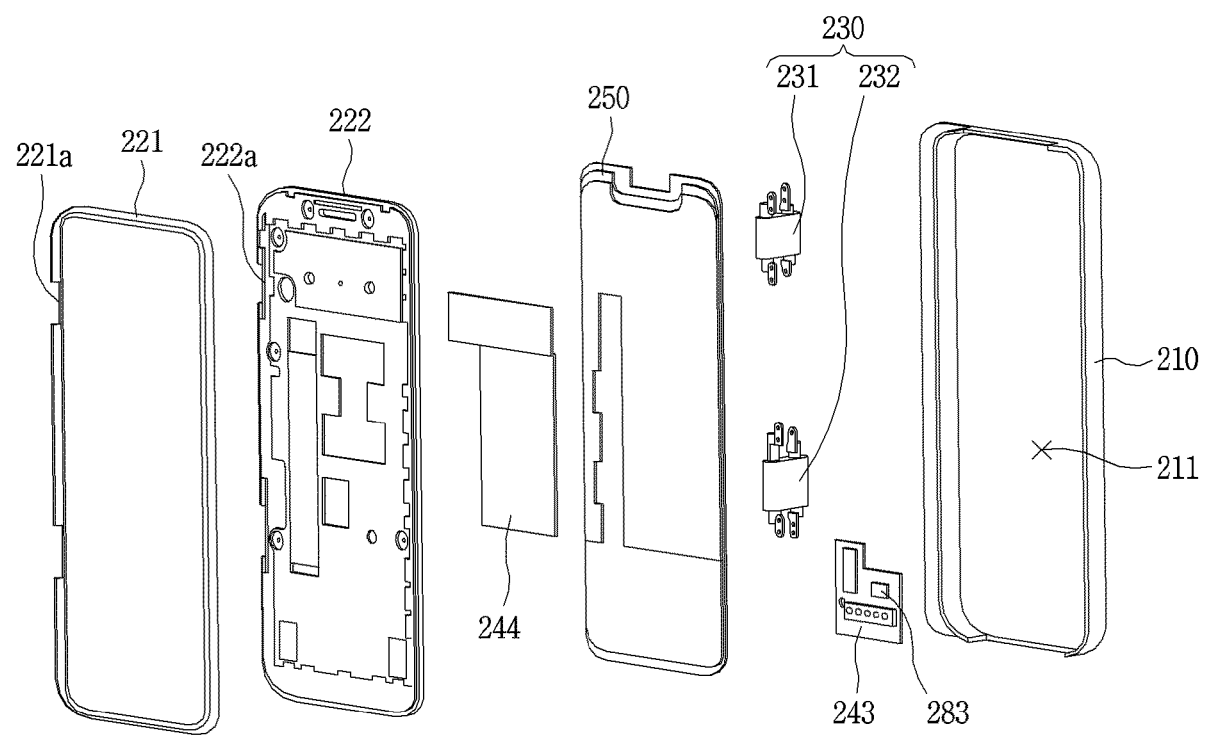
Figure 2C:
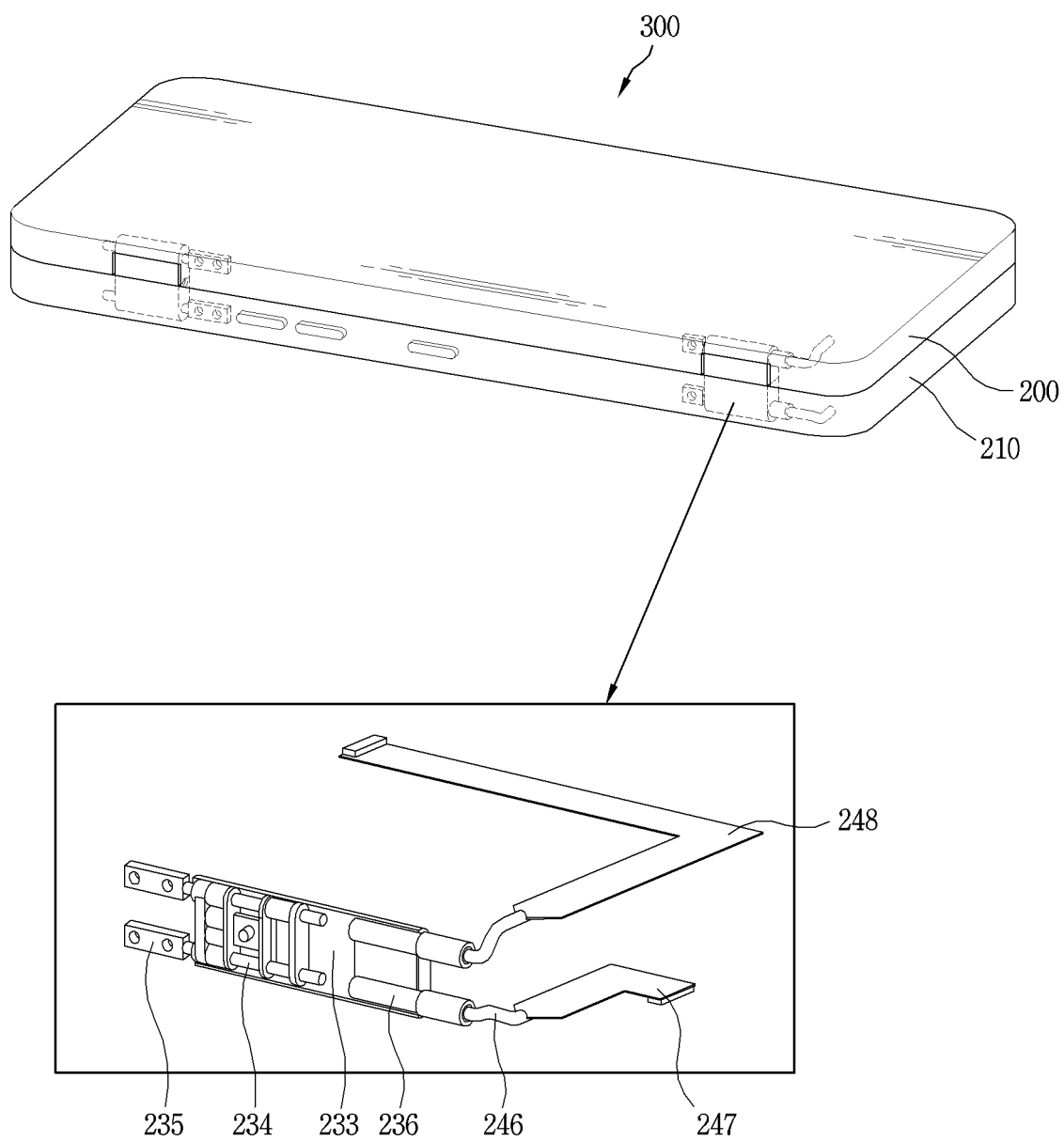

FIGS. 2A, 2B, and 2C are conceptual views illustrating a main structure of an electronic device in accordance with the present disclosure.

The first body 210 of the case 200 may have an accommodation space 211 in which a rear surface of the body of the mobile terminal is accommodated. The first body may accommodate at least a portion of the mobile terminal in the accommodation space 211, and the rear surface of the mobile terminal may be disposed on a bottom surface of the accommodation space 211. However, the present disclosure is not necessarily limited thereto, and for example, the first body may be formed in a plate shape coupled to the rear surface of the mobile terminal, or may be configured to be coupled to a side surface of the mobile terminal.

The second body 220 on which the second display unit 250 is disposed may be rotatably coupled to the first body by a connecting portion 230. More specifically, the connecting portion 230 may be disposed between the first and second bodies 210 and 220 such that the first and second bodies 210 and 220 can rotate relative to each other.

Referring to the drawings, the second body 220 may include a first cover 221, a second cover 222, and a second display unit 250. An accommodating groove 221a in which at least a part of the connecting portion 230 is accommodated may be formed in the first cover 221. The second cover 222 may be coupled to the first cover 221 and may be a frame to which various electronic components are mounted. As an example, a second circuit board to be described later may be mounted on the second cover 222.

The second cover 222 may be rotatably coupled to the connecting portion 230. The second cover 222 may include a groove 222a at a position corresponding to the accommodating groove 221a of the first cover 221, and the connecting portion 230 may be disposed in the groove 222a. In this case, the second display unit 250 may be mounted to the second cover 222.

The connecting portion 230 may include first and second hinges 231 and 232 spaced apart from each other along a side surface of the first body 210. The first and second hinges 231 and 232 each may include a hinge body 233 and a hinge shaft 234.

A hinge groove (not shown) may be formed in the hinge body 233. The hinge shaft 234 may be inserted into the hinge groove so that the first and second bodies 210 and 220 can rotate relative to each other. The hinge shaft 234 may be provided in plurality, each of which may include a coupling portion 235 disposed on one side thereof to be coupled to the first and second bodies 210 and 220.

Here, the case 200 may include a wireless communication unit 283 and a wiring part 242, through which the mobile terminal 100 can control the second display unit 250.

The wireless communication unit 283 may be disposed in the first body 210 to perform short-range wireless communication with the mobile terminal. The mobile terminal 100 may include a wireless communication unit (hereinafter, referred to as a "first wireless communication unit") that performs short-range wireless communication with a wireless communication unit (hereinafter referred to as a "second wireless communication unit") of the case 200.

The first wireless communication unit 116 (see FIG. 3C) may transmit a radio signal (wireless signal) to the rear of the mobile terminal 100, and the second wireless communication unit 283 may be disposed in the first body 210 to face the first wireless communication unit 116 so as to receive the radio signal. The first wireless communication unit 116 and the second wireless communication unit 283 each may include, for example, a Keyssa chip for wireless data transmission and reception, and the Keyssa chips may be disposed at positions with being spaced apart from each other by a distance of several cm or less along a thickness direction of the mobile terminal. Accordingly, the first wireless communication unit 116 and the second wireless communication unit 283 may perform communication through a short-range communication method having a transmission distance of about several cm.

As illustrated, the first body 210 may include a first circuit board 243 on which the second wireless communication unit 283 is disposed, and the second body 210 may include a second circuit board 244 that is disposed beneath the second display unit 250 and electrically connected to the first circuit board 243 through the wiring part 242. The second circuit board 244 may be connected to the second display unit 250 and perform a function of transferring a control signal received from the mobile terminal 100 to the second display unit 250.

That is, the second circuit board 244 may transfer the data transmitted and received between the first wireless communication unit 116 and the second wireless communication unit 283 to the second display unit 250.

The wiring part 242 may be a portion by which the first and second bodies 210 and 220 are electrically connected through the connecting portion 230. The radio signal (or data) received through the short-range wireless communication with the mobile terminal 100 may be transferred to the second display unit 250 through the wiring part 242. For this connection, a connection passage through which the wiring part 242 passes may be defined in the connecting portion 230.

As an example, an accommodation space for accommodating at least a portion of the wiring part 242 may be defined in any one of the first and second hinges 231 and 232. More specifically, the first hinge 231 may be closer to an upper side of the mobile terminal than the second hinge 232, and the second hinge 232 may be closer to a lower side of the mobile terminal 100 than the first hinge 231. The second circuit board 244 may be disposed adjacent to a lower end of the case 200, and thus the first wireless communication unit 116 and the second wireless communication unit 283 may be respectively disposed at the lower side of the case 200 or the mobile terminal 100.

In this structure, the accommodation space may be defined in the second hinge 232. The second hinge 232 may include an extension portion 236 extending from the hinge body 233. The extension portion 236 may include a cable 246 extending to the first body 210 and the second body 220. The accommodation space may be defined in the extension portion 236 and the cable 246 may be accommodated in the accommodation space. First and second flexible circuit boards 247 and 248 may be disposed at both ends of the cable 246, respectively, and the first and second flexible circuit boards 247 and 248 may be electrically connected to the first and second circuit boards 243 and 244. With this structure, a signal for controlling the second display unit 250 may be wirelessly transmitted from the mobile terminal to the first body 210 and transmitted to the second body 220 through a wire.

Meanwhile, referring to the drawings, the first circuit board 243 may include a power terminal (e.g., pogo-pin, 249) that is brought into contact with a power supply terminal (not shown) of the mobile terminal to receive power from the mobile terminal. The power terminal 249 may be electrically connected to the wiring part 242 to supply power to the second display unit 250. With this structure, power supplied to the second display unit 250 may be transmitted from the mobile terminal through a wired path.

According to the structure described above, the electronic device can perform an operation of controlling the first and second display units 151 and 250 in an interoperating manner by using short-range wireless communication and a wired power supply path. Hereinafter, a structure and functions of the mobile terminal will be described in detail, and then the control operation will be described.

Figure 3A:
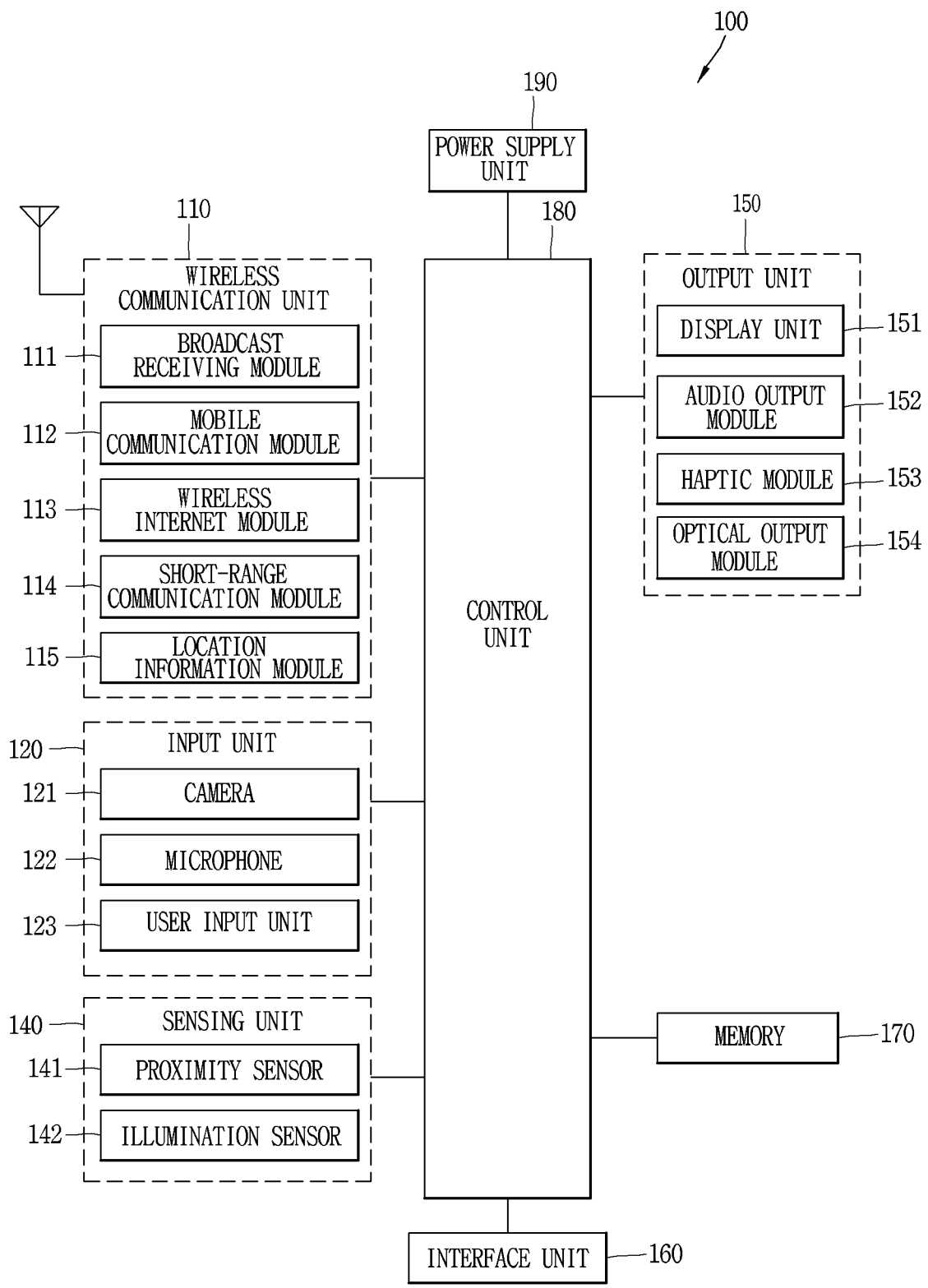
FIGS. 3A, 3B, and 3C are conceptual views illustrating one example of a mobile terminal in accordance with the present disclosure.
Figure 3B:
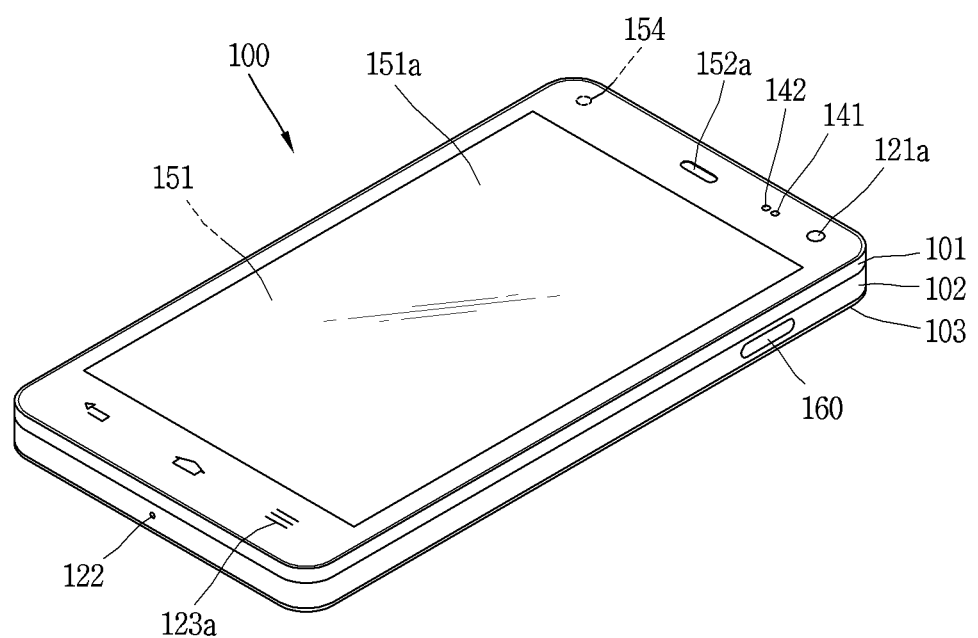
Figure 3C:
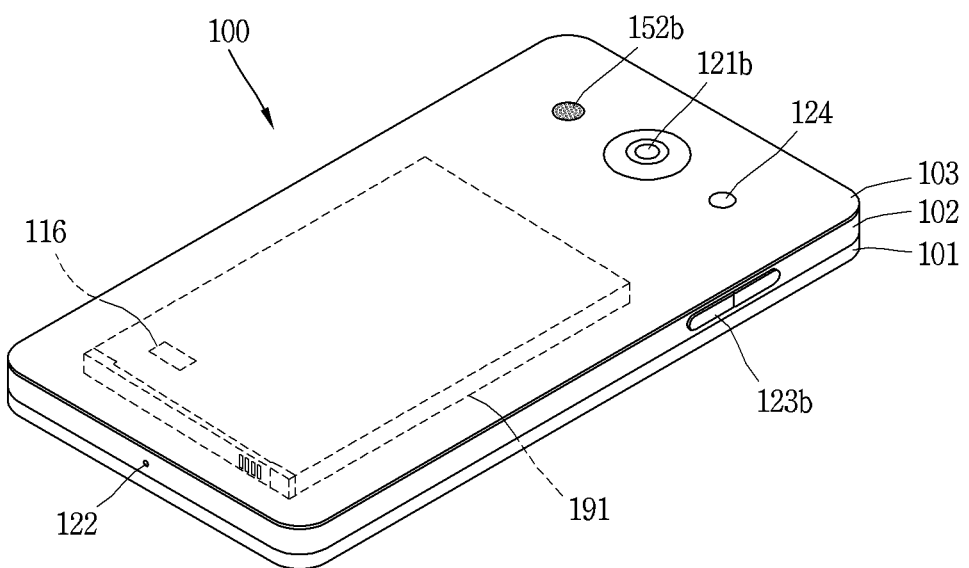

FIGS. 3A, 3B and 3C are conceptual views illustrating one example of a mobile terminal in accordance with the present disclosure. The mobile terminal 100 according to the present disclosure may be coupled to the case of the electronic device described above.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIGS. 3A to 3C, FIG. 3A is a block diagram of a mobile terminal in accordance with one exemplary implementation of the present disclosure, and FIGS. 3B and 3C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a control unit (or controller) 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules that connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the control unit 180 to perform an operation (or function) for the mobile terminal 100.

The control unit 180 typically functions to control an overall operation of the mobile terminal 100, in addition to the operations associated with the application programs. The control unit 180 may provide or process information or functions appropriate for a user by processing signals, data, information and the like, which are input or output by the aforementioned various components, or activating application programs stored in the memory 170.

Also, the control unit 180 may control at least some of the components illustrated in FIG. 3A, to execute application programs that have been stored in the memory 170. In addition, the control unit 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various implementations disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various implementations achieved through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A), and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is wireless personal area networks.

Here, another mobile terminal (that may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) that transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 is for inputting image or video information (or signal), audio information (or signal), data, or user input. The mobile terminal 100 may include one or a plurality of cameras 121 through which such image information can be obtained. The cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the control unit 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The control unit 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the control unit 180 can process data corresponding to proximity touches and proximity touch patterns sensed by the proximity sensor 141, and cause output of visual information on the touch screen. In addition, the control unit 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which area of the display 151 has been touched. Here, the touch controller may be a component separate from the control unit 180, the control unit 180, and combinations thereof.

Meanwhile, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal 100 emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

As described above, the control unit 180 may typically control operations relating to application programs and the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary implementations disclosed herein.

The power supply unit 190 receives external power or provides internal power and supply the appropriate power required for operating respective elements and components included in the HMD 100 under the control of the control unit 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various implementations described herein may be implemented in a computer-readable medium, a machine-readable medium, or similar medium using, for example, software, hardware, or any combination thereof.

Referring to FIGS. 3B and 3C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this implementation, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 3B and 3C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be excluded or rearranged, or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit 123 (see FIG. 3A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the control unit 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 3A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 3A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

As described above, in the electronic device 300 according to the present disclosure, the first wireless communication unit 116 (refer to FIG. 3C) provided on the rear side of the mobile terminal and the second wireless communication unit 283 provided on the first body 210 of the case 200 may perform data communication with each other. Hereinafter, a method of performing data communication between the first and second wireless communication units 116 and 283 will be described in more detail with accompanying drawings.

Figure 4:
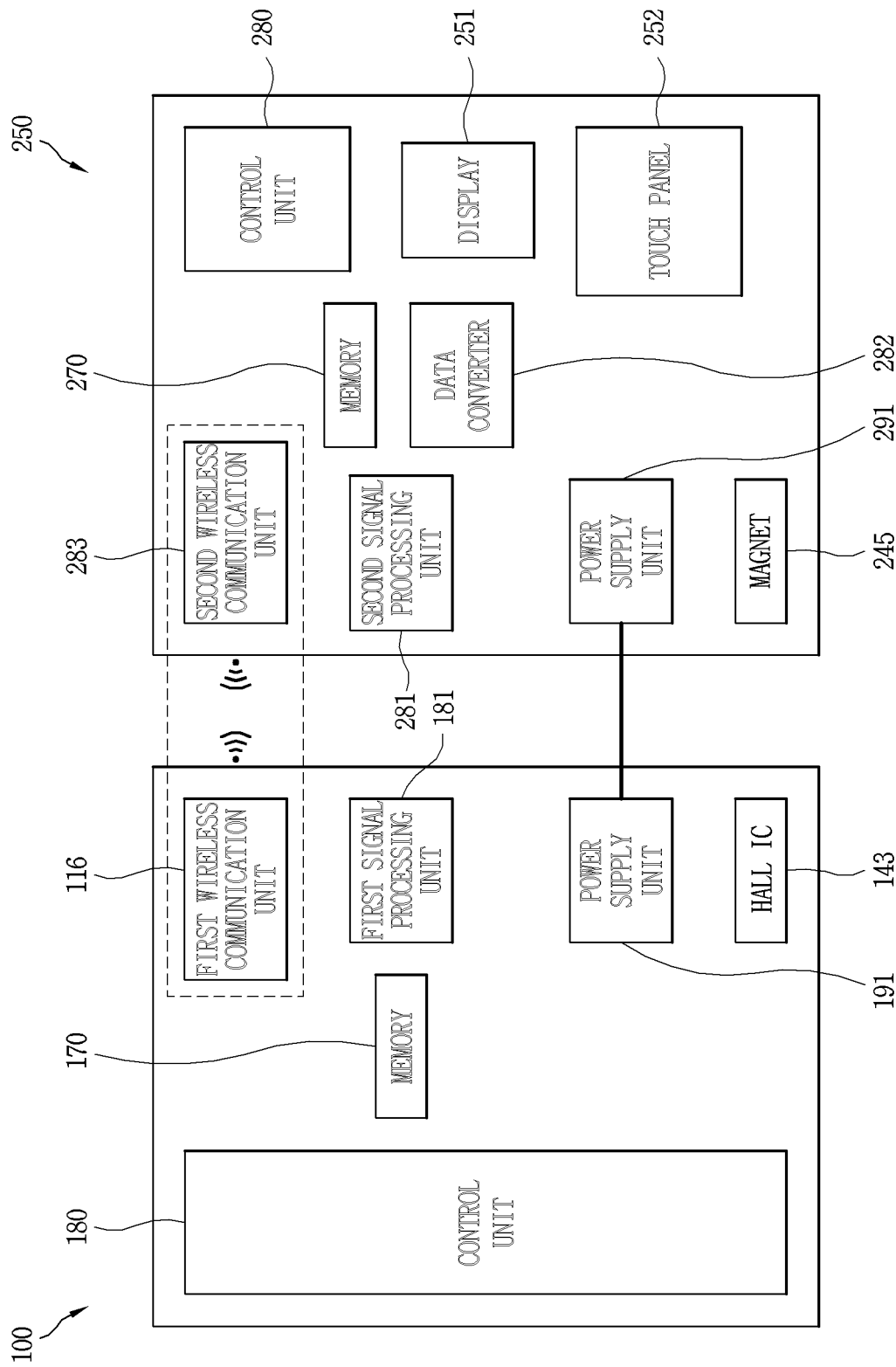
FIG. 4 is a conceptual view illustrating a control method between display units provided on a mobile terminal and a case in an electronic device in accordance with the present disclosure.

FIG. 4 is a conceptual view illustrating a control method between display units provided on a mobile terminal and a case in an electronic device in accordance with the present disclosure.

The mobile terminal 100 according to the present disclosure may be coupled to the first body 210. When the mobile terminal 100 is coupled to the first body 210, the first and second wireless communication units 116 and 283 may face each other.

The first wireless communication unit 116 provided in the mobile terminal 100 may be included in the wireless communication unit 110 described above with reference to FIG. 3A. The wireless communication unit 110 of the mobile terminal 100 may include a plurality of wireless communication parts, and the plurality of wireless communication parts may be respectively disposed at different positions on the mobile terminal 100. In particular, in the mobile terminal 100 according to the present disclosure, the first wireless communication unit 116 may be provided on the rear side of the mobile terminal 100. Accordingly, when the mobile terminal 100 is coupled to the first body 210, the first wireless communication unit 116 may perform data communication with the second wireless communication unit 283 provided on the first body 210.

The first and second wireless communication units 116 and 283 according to the present disclosure may be provided with contactless connectors for data communication. The contactless connectors may be electromagnetic connectors that form electromagnetic communication links, and may be disposed on different devices to establish the electromagnetic communication links.

The first and second communication units 116 and 283 may include transceivers for converting electrical signals into electromagnetic (EM) signals. The transceiver of any one of the first and second communication units 116 and 283 may convert electrical signals into EM signals. These EM signals may be received by another transceiver, which may convert the EM signals into the electrical signals.

Meanwhile, in the present disclosure, the term "transceiver" may refer to a device such as an integrated circuit (IC) including a transmitter Tx and a receiver Rx that are used for transmitting and receiving information (data). In general, a transceiver may be operable in a half-duplex mode (alternating transmission and reception) and a full-duplex mode (simultaneous transmission and reception), or may be configured as either a transmitter or a receiver. The transceiver may include separate integrated circuits for a transmitting function and a receiving function. The terms "contactless", "coupled pair" and "proximity coupling", as used herein, refer to implementing electromagnetic (EM) connection and signal transfer rather than electrical (wired, contact-based) connection and signal transfer between the first and second wireless communications units 116 and 283.

As used herein, the term "contactless type" may refer to a carrier-assisted, dielectric coupling system that may have an optimal range in the range of 0 to 5 centimeters. The connection may be verified by proximity of one of the first and second wireless communication units 116 and 283 with respect to the other. A plurality of contactless transmitters and receivers may occupy a small space. Electromagnetically established contactless links may be point-to-point type links, unlike wireless links that typically broadcast to several points.

The first and second communication units 116 and 283 may establish a wireless connection to transmit data from one location to another, or may establish a point-to-point contactless communication link or coupled-pair which does not require a physical wired connection. Transceivers may be extremely high frequency (EHF) transceivers.

For example, when the mobile terminal 100 is coupled to the first body 210, the first wireless communication unit 116 of the mobile terminal 100 and the second wireless communication unit 283 of the first body 210 may face each other within a preset distance. Accordingly, a contactless communication link may be established between the first and second wireless communication units 116 and 283.

Data transmission between the mobile terminal 100 and the second display unit 250 may be performed through the EHF transceivers included in the first and second wireless communication units 116 and 283, respectively.

The second wireless communication unit 283, namely, the EHF transceiver that transmits and receives data for the second display unit 250 may be provided on the first body 210, as illustrated in FIGS. 2A, 2B, and 2C.

The second wireless communication unit 283 provided on the first body 210 may perform data transmission and reception in a wired manner with the second display unit 250 through the wiring part 242 included in the connecting portion 230.

Meanwhile, as described above, as the mobile terminal 100 is coupled to the first body 210, the EHF transceivers included in the first and second wireless communication units 116 and 283, respectively, may be coupled to each other through proximity coupling.

The EHF transceiver pair coupling between the first and second wireless communication units 116 and 283 may provide a contactless data path, passage, or channel. In some implementations, data paths are unidirectional (e.g., data flow from the mobile terminal 100 to the second display unit 250 through a specified passage) or bidirectional (e.g., bidirectional data flow between the mobile terminal 100 and the second display unit 250 through a specified passage).

The first and second wireless communication units 116 and 283 according to the present disclosure may be configured to transmit and receive various types of data. For example, the data may be one of graphic data, audio data, video data, touch event data, and a combination thereof.

On the other hand, the second display unit 250 provided on the second body 220 may be operated by power supplied from the mobile terminal 100.

At this time, as described above, power may be supplied to the second display unit through an electrical connection path defined by the first circuit board 243 electrically connected to the mobile terminal 100, the wiring part 242 provided in the connecting portion 230, and the second circuit board provided in the second body 220.

That is, as illustrated in FIG. 4, a power supply unit 191 of the mobile terminal 100 may supply an operating current (or power) to a power supply unit 291 of the second display unit 250 through the electrical connection path defined by the first circuit board 243, the wiring part 242 provided in the connecting portion 230, and the second circuit board 244 provided in the second body 220.

On the other hand, as aforementioned, the mobile terminal 100 may be detachably coupled to the first body 210. In addition, the mobile terminal 100 may be configured to detect whether it is coupled to the first body 210. For the detection, the first body 210 may include a magnet 245 on one surface facing the mobile terminal 100. The mobile terminal 100 may include a hall sensor 143 disposed on its rear side to sense a magnetic field corresponding to the magnet 245 when the body of the mobile terminal 100 is coupled to the first body 210. When the magnetic field is sensed by the hall sensor, the mobile terminal may recognize that it has been coupled to the case and perform a preset control.

For example, when the magnetic field is sensed by the hall sensor 143, a control unit 180 of the mobile terminal 100 may control a power supply unit 190 to supply an operating current to the second display unit 250 disposed on the second body 220.

That is, the second display unit 250 provided on the second body 220 may be operated by power supplied from the mobile terminal 100.

In this way, when the operating current is supplied to the second display unit 250, the system of the second display unit 250 may be booted up and initialized, and may be in an operable standby state.

At this time, the second display unit 250 may have any one of an active state and an inactive state. Even in the inactive state of the second display unit 250, a touch sensor (or touch panel) 252 provided on the second display unit 250 may be activated so as to detect a touch applied to the second display unit 250.

On the other hand, when the second display unit 250 is activated, the mobile terminal 100 may transmit screen information (digital image information) to be output to the display 251 provided on the second display unit 250 through the first wireless communication unit 116. At this time, as described above, the digital image signal may be transmitted as a signal of a frequency band of 60 GHz wirelessly through a wireless connector.

As described above, the second display unit 250 may receive data (e.g., a digital image signal, and the like) from the first wireless communication unit 116 through the second wireless communication unit 283 and the second circuit board 244. In this case, the digital image signal may be converted into a format that can be output to the second display unit 250 through a data converter 282. For example, the second display unit 250 may be implemented as an LCD panel. At this time, the digital image signal in a DP format, received from the mobile terminal 100, may be converted into a data format (MIPI format) that the LCD panel can receive through the data converter 282, and be transmitted and output to the display 251.

Meanwhile, types of data transmitted and received through the first and second wireless communication units 116 and 283 may be preset. For example, only data corresponding to image signals may be transmitted and received through the first and second wireless communication units 116 and 283.

At this time, signals such as a communication control signal, a touch signal, and a brightness control signal, which are required to be transmitted between the mobile terminal 100 and the second display unit 250, except for the image signal, may be transmitted and received sequentially via multiple input channels, first and second signal processing units 181 and 281, the first circuit board 243, and the power terminal (e.g., the pogo-pin) 249. Meanwhile, the initialization of the second display unit 250 may be controlled by a controller included in the second display unit 250.

Hereinafter, a screen control method between the first display unit provided in the mobile terminal and the second display unit provided in the case in the electronic device 300 according to the present disclosure will be described in more detail with reference to FIGS. 5A to 5H.

Figure 5A:
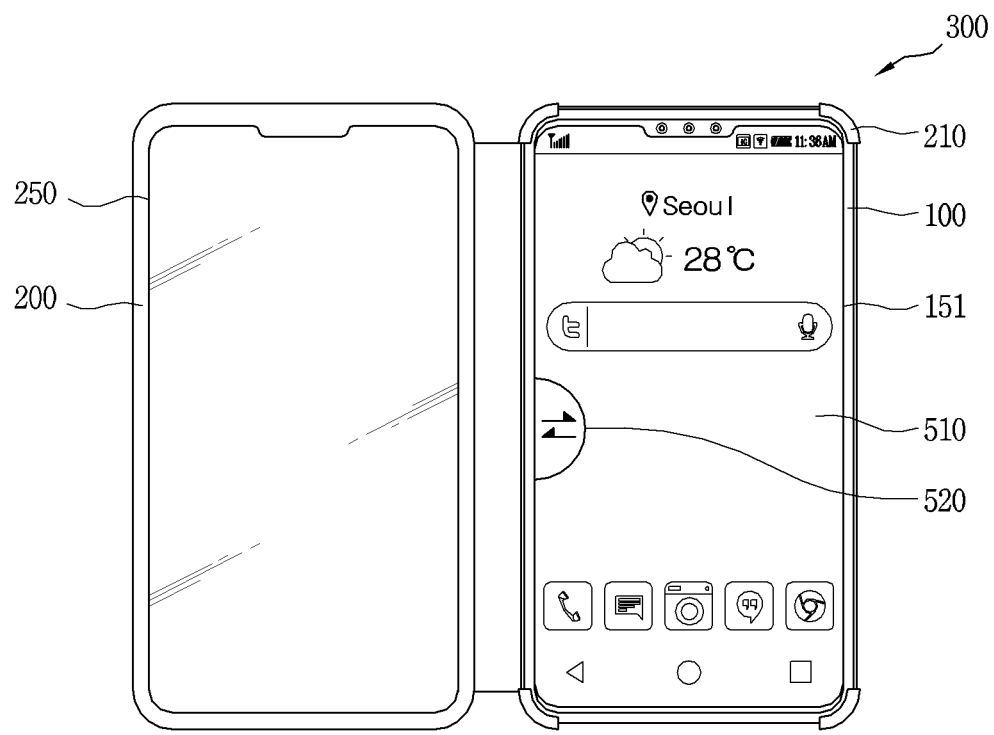

In FIG. 5A, the first display unit 151 provided in the mobile terminal 100 may be in an active state, and the second display unit 250 provided in the case 200 may be in an inactive state.

In one example, when the electronic device 300 is switched from a closed state to an open state, the first display unit 151 may be switched to an active state, and for example, a home screen 510 may be output.

When the electronic device 300 is switched from the closed state to the open state, an operating current may be supplied to the second display unit 250 but may be maintained in the inactive state until an input is applied. Here, the input may be applied to wake the second display unit 250 up, and for example, may be a touch input (e.g., a tap/double tap, hereinafter 'knock-knock function') applied to the second display unit 250.

When a touch input is applied to the second display unit 250, a touch signal corresponding to the touch input may be transmitted to the first wireless communication unit 116 through the second wireless communication unit 283 (FIG. 4). Then, the control unit 180 of the mobile terminal may determine whether the touch signal received through the first wireless communication unit corresponds to a preset type of touch. As a result of the determination, when the touch signal is the preset type of touch (e.g., a tap/double tap), the control unit 180 may generate a control signal for switching the second display unit 250 to an active state and transmit the control signal to the second display unit 250 through the first wireless communication unit 116 and the second wireless communication unit 283.

Meanwhile, in another example, when the electronic device 300 is switched from a closed state to an open state, both the first display unit 151 and the second display unit 250 may be in an active state. In this case, for example, a first home screen may be output to the first display unit 151 and a second home screen different from the first home screen or a predetermined screen may be output to the second display unit 250.

On the other hand, an icon 520 that indicates hidden menus related to the control of the second display unit 250 may be displayed on one area, for example, an edge area of the home screen 510 output on the first display unit 151. The icon 520 may be moved to a different position or may be hidden 151, in response to a drag touch input.

The control unit of the mobile terminal 100 may display hidden menus on the first display unit 151 based on a touch input applied to the displayed icon 520. An image (→) guiding a drag direction of a touch input for displaying the hidden menus may be displayed on the icon 520.

For example, as illustrated in FIG. 5B, in a state where the home screen 510 is output to the first display unit 151 and an execution screen 530 of a web application is output to the second display unit 250, when a touch input applied to the icon 520 of the home screen 510 is dragged from the edge area toward a center of the first display unit 151, the hidden menus may be displayed.

The displayed menus may provide various functions for interoperably controlling the first display unit 151 and the second display unit 250 based on an input to the first display unit 151. For example, as illustrated in FIG. 5B, a screen switching menu 521, a screen sending menu 522, a screen importing menu 523, a main screen power saving menu 524, and a dual screen-off menu 525 may be provided. However, the present disclosure may not be limited to the illustrated examples, and more other menus may be displayed.

FIGS. 5C to 5F specifically illustrate various functions for cooperatively controlling the first display unit 151 and the second display unit 250 based on a touch input applied to a menu displayed on the first display unit 151.

Hereinafter, FIG. 5C illustrates an operation corresponding to a switching function between a screen displayed on the first display unit 151 and a screen displayed on the second display unit 250.

Referring to FIG. 5C, first screen information, for example, a home screen 510 may be output to the first display unit 151 and second screen information, for example, an execution screen 530 of a web application may be output to the second display unit 250.

As described above, in a state where different pieces of screen information are output to the first display unit 151 and the second display unit 250, when a touch input is applied to the screen switching menu 521 among the menus displayed on the first display unit 151, the home screen 510 being output on the first display unit 151 may move to the second display unit 250. At the same time, the execution screen 530 being output on the second display unit 250 may move to the first display unit 151.

To this end, the control unit of the mobile terminal 100 may move a task corresponding to the home screen 510 output on the first display unit 151 to a memory stack allocated for the second display unit 250. In addition, the control unit of the mobile terminal 100 may move a task corresponding to the execution screen 530 output on the second display unit 250 to a memory stack allocated for the first display unit 151.

In this way, after the screen switching between the first display unit 151 and the second display unit 250, when an input for displaying the hidden menus again is applied and the screen switching menu 521 is selected, the screens may be restored to their original states.

To this end, the control unit of the mobile terminal 100 may move the most recently input task in the memory stack allocated for the second display unit 250 back to the memory stack for the first display unit 151. At the same time, the control unit of the mobile terminal 100 may move the most recently input task in the memory stack for the first display unit 151 to the memory stack allocated for the second display unit 250.

Meanwhile, although not shown, when the screen sending menu 522 is selected on the first display unit 151, only the screen being output on the first display unit 151 may be moved to the second display unit 250.

To this end, the control unit of the mobile terminal 100 may move a task corresponding to the screen being output on the first display unit 151 to the memory stack allocated for the second display unit 250. In this case, a screen corresponding to the next task of the memory stack for the first display unit 151 may be output to the first display unit 151. At this time, if there is no next task, the home screen may be output.

The screen importing menu 523 of the first display unit 151 may be activated when the second display unit 250 is in an active state and at least the screen sending menu 522 has been executed.

When the screen importing menu 523 is selected in a state that such conditions are satisfied, the screen which has been output on the first display unit 151 and is currently output on the second display unit 250 may be displayed back on the first display unit 151. In addition, the screen that has been output on the second display unit 250 before the screen of the first display unit 151 is imported may appear back on the second display unit 250.

To this end, the control unit of the mobile terminal 100 may move a task corresponding to the screen output on the second display unit 151 to the memory stack allocated for the first display unit 151.

Hereinafter, FIG. 5D illustrates an operation corresponding to a function of switching only a screen displayed on the first display unit 151 to a power saving mode.

When a touch input is applied to the main screen power saving menu 524 among the menus displayed on the first display unit 151, a control signal corresponding to the touch signal corresponding to the corresponding menu may be generated to execute a power saving mode for the first display unit 151.

At this time, since only the first display unit 151 is executed in the power saving mode, an image signal corresponding to screen information output on the second display unit 250 may continuously be transmitted from the mobile terminal 100 to the second display unit 250 through the first and second wireless communication units 116 and 283.

In response to the execution of the power saving mode for the first display unit 151, brightness of the home screen 510 of the first display unit 151 may be adjusted darkly as illustrated in FIG. 5D. On the other hand, the execution screen 530 of the second display unit 250 may be maintained in previous brightness.

Hereinafter, FIGS. 5E and 5F illustrate operations corresponding to a function of controlling the second display unit 250 to be turned on/off by using a touch input to the first display unit 151.

First, referring to FIG. 5E, when the dual screen-off menu 525 displayed on the first display unit 151 is selected, the control unit 180 of the mobile terminal may transfer a control signal for switching the second display unit 250 to an inactive state to the second display unit 250 through the first wireless communication unit 166 and the second wireless communication unit 283. Accordingly, as illustrated in lower drawings of FIG. 5E, the second display unit 250 may be switched to an inactive state.

Then, the icon (hereinafter, 'first icon') 520 indicating that there are hidden menus displayed on the first display unit 151 may be switched to another icon (hereinafter 'second icon') 520' indicating a locked state.

As described above, as the second display unit 250 is switched to an inactive state based on the input to the first display unit 151, an operating current that is supplied from the mobile terminal 100 to the second display unit 250 may not be supplied any more.

However, when a memory stack for screen information output on the second display unit 250 is allocated to the mobile terminal 100, the mobile terminal 100 may recognize the task corresponding to the screen information output on the second display unit 250.

In this way, after the dual screen-off menu 525 is selected, as illustrated in FIG. 5F, when a touch input applied to the second icon 520' is dragged in a predetermined direction, for example, toward a center of the edge area of the first display unit 151, only a dual screen-on menu 525' may be displayed.

When a touch input is applied to the dual screen-on menu 525', the control unit 180 of the mobile terminal may transmit a control signal for switching the second display unit 250 to an active state to the second display unit 250 through the first wireless communication unit 166 and the second wireless communication unit 283. Then, the operating current may be supplied from the mobile terminal 100 to the second display unit 250 again.

In this case, the screen information 530 that was output immediately before switching to the inactive state may be output again to the second display unit 250. To this end, the control unit 180 of the mobile terminal may control states of tasks of the memory stack allocated for the second display unit 250 to be maintained. In another example, unlike FIG. 5F, a home screen may be output to the second display unit 250 switched to the active state.

As such, when the second display unit 250 is turned on, the second icon 520' displayed on the first display unit 151 may be switched to the first icon 520 indicating that there are the hidden menus.

On the other hand, instead of using the icon 520, a first screen displayed on the first display unit 151 may be sent to the second display unit 250, or a second screen displayed on the second display unit 250 may be sent to the first display unit 151 using a preset touch gesture. Here, the preset touch gesture may be a multi-finger touch gesture.

For example, as illustrated in FIG. 5G, in a state where first screen information 540 is displayed on the first display unit 151 and second screen information 530 is displayed on the second display unit 250, when a three-finger touch gesture applied to the second display unit 250 is dragged toward the first display unit 151, the second screen information 530 displayed on the second display unit 250 may be sent to the first display unit 151. In other words, a task of the memory stack allocated for the second display unit 250 may move to the memory stack for the first display unit 151.

Accordingly, an application corresponding to the first screen information 540 displayed on the first display unit 151 may be located on a background and the second screen information 530 may be displayed on the first display unit 151. In addition, a screen of an application which is currently executed on the background or a home screen may be displayed on the second display unit 250.

Similarly, as illustrated in FIG. 5h, in a state where the first screen information 540 is displayed on the first display unit 151 and the second screen information 530 is displayed on the second display unit 250, when a three-finger touch gesture applied to the first display unit 151 is dragged toward the second display unit 250, the first screen information 540 displayed on the first display unit 151 may be sent to the second display unit 250. In this case, a task of the memory stack allocated for the first display unit 151 may move to the memory stack for the second display unit 250.

Accordingly, an application corresponding to the second screen information 530 displayed on the second display unit 250 may be located on a background, and the second screen information 540 may be displayed on the second display unit 250. In addition, a screen of an application that is currently executed on the background or a home screen may be displayed on the first display unit 151.

Hereinafter, description will be given of an operation of performing screen control independently in a manner of controlling the first display unit 151 provided in the mobile terminal and the second display unit 250 provided in the case through the single control unit 180 in accordance with one implementation of the present disclosure, with reference to FIG. 6.

FIG. 6 is a flowchart illustrating a control method of an electronic device in accordance with the present disclosure.

Referring to FIG. 6, the control unit 180 of the mobile terminal may detect a state in which an execution screen of a first application is displayed on the first display unit 151 of the mobile terminal and an execution screen of a second application is displayed on the second display unit 250 of the case (S10).

Here, the control unit 180 of the mobile terminal may detect that the electronic device has been switched from the closed state to the open state, as defined above, before detecting the display state.

To this end, the control unit 180 may detect that the electronic device has been switched from the closed state to the open state through a light sensor or a sensor disposed in at least one of the hinge body 233 and the hinge shaft 234 that form the connecting portion 230 for connecting the first and second bodies. In addition, as will be described in more detail below, the control unit 180 may recognize a rotated degree, namely, a rotation angle (or a rotation angle range) by the relative rotation of the first and second bodies through the sensor provided in at least one of the hinge body 233 and the hinge shaft 234 forming the connecting portion 230.

The control unit 180 may then activate the first display unit 151 according to the detection of the switching to the open state, and supply an operating current for the second display unit 250 to the case through the wiring part 242 so as to activate the second display unit 250.

Here, the first application and the second application may be defined as different applications. Also, the execution screens of the first and second applications may include different home screens. However, the different home screens may include icons and/or widgets of the same application.

In this state, when a touch signal of a first touch applied to the execution screen of the first application is received, the control unit 180 may perform an operation for controlling the execution screen of the first application according to a first control signal corresponding to the touch signal of the first touch (S20).

Here, the first touch may be a simple touch input or may be a preset type of touch gesture (e.g., a long touch input, a double tap, a touch and drag, a pinch-in/pinch-out touch gesture, etc.). In addition, the first control signal corresponding to the touch signal of the first touch, unless otherwise specified, may be a control command corresponding to a content type of the execution screen of the first application, or an applied position, an applied time, and an applied method of the first touch.

Also, in response to a reception of a touch signal of a second touch applied to the execution screen of the second application, the control unit 180 may transmit a second control signal corresponding to the touch signal of the second touch to the second display unit 250 of the case. Accordingly, the execution screen displayed on the second display unit 250 may be controlled (S30).

Specifically, like the first touch, the second touch may be a simple touch input or a preset type of touch gesture. The touch signal corresponding to the second touch may be transmitted to the control unit 180 of the mobile terminal through the wiring part 242, and the control unit 180 may generate a second control signal corresponding to the touch signal of the second touch. Then, the generated second control signal may be transferred back to the second display unit 250 through the wiring part 242.

The touch signal corresponding to the second touch and the second control signal may be transmitted from the mobile terminal 100 to the case 200 or from the case 200 to the mobile terminal 100 through the wiring part 242, the second wireless communication unit 283 connected to the wiring part 242, and the first wireless communication unit 116.

In this way, the first control signal may be directly transmitted from the control unit 180 to the first display unit 151 without using the first wireless communication unit 116. The second control signal may be transmitted to the second display unit 250 through the first wireless communication unit 116, the wiring part 242, and the second wireless communication unit 283 connected to the wiring unit 242.

Accordingly, the touch signal of the first touch and the touch signal of the second touch can be processed separately, and accordingly the operations corresponding to the first and second control signals can be performed simultaneously without affecting each other.

Hereinafter, detailed examples of the operations in FIG. 6 will be described with reference to FIGS. 7A, 7B, and 7C.

Figure 7A:
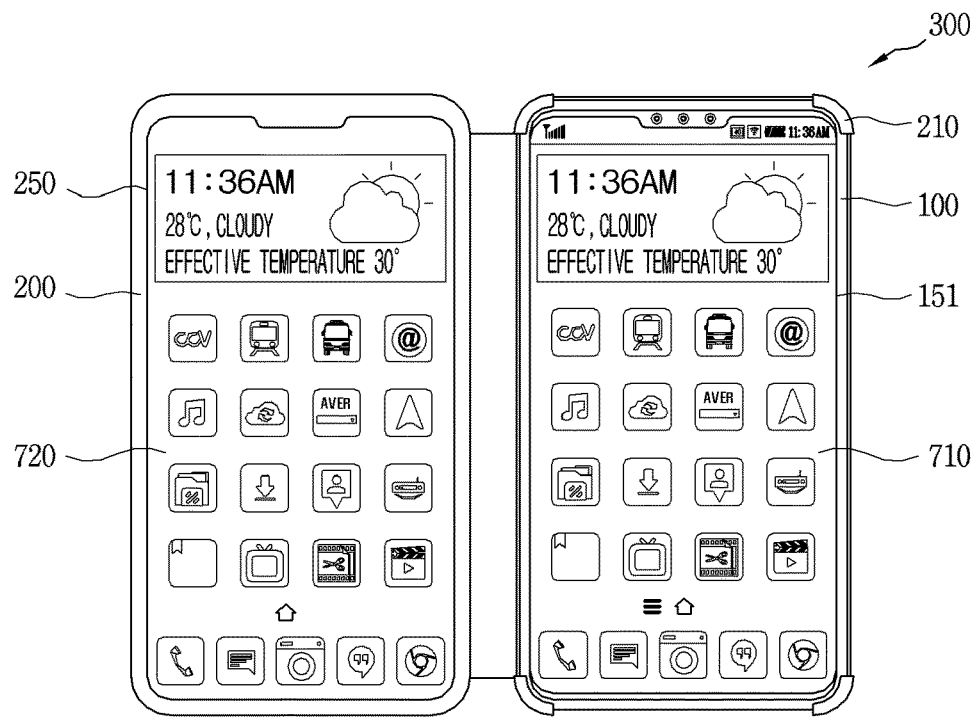
FIGS. 7A, 7B, and 7C are exemplary conceptual views related to the operation process of FIG. 6.

First, as illustrated in FIG. 7A, when the electronic device 300 according to the present disclosure is in the open state, a first home screen 710 may be output on the first display unit 151, and a second home screen 710 may be displayed on the second display unit 250 of the case.

To this end, although not shown, when the electronic device 300 is switched from the closed state to the open state, the control unit 180 of the mobile terminal may switch both the first and second display units 151 and 250 from an inactive state to an active state before outputting different home screens.

Figure 7B:
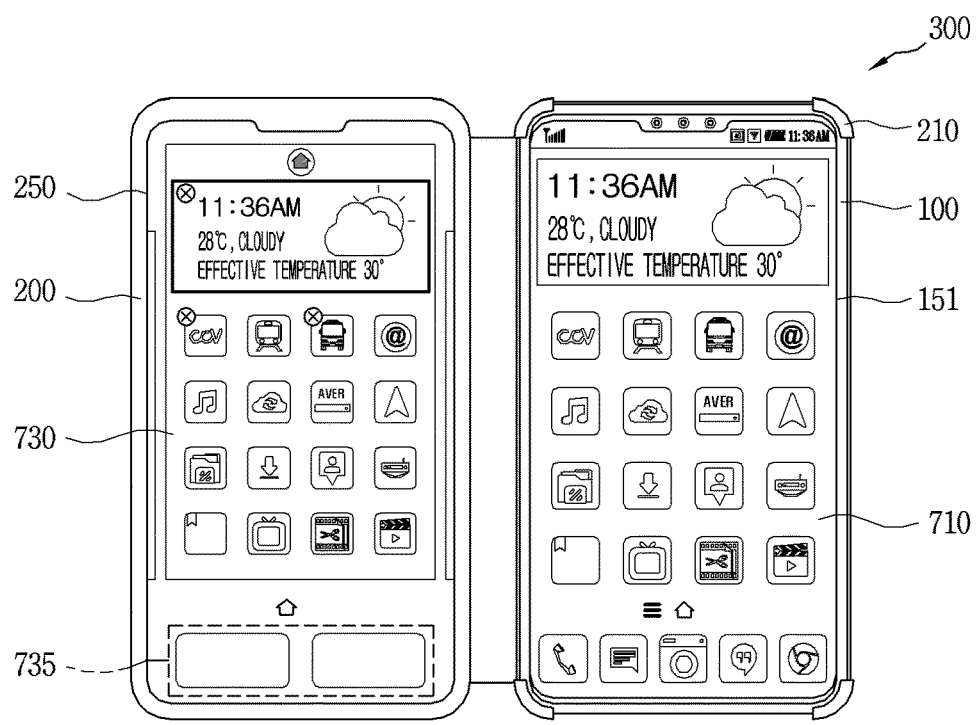

In this state, when a preset touch gesture applied to the second display unit 250 is detected, for example, when a drag touch gesture that a touch applied to the second display unit 250 is dragged upward or a flicking gesture is detected, the control unit 180 may switch the second home screen 720 to an editing screen 730 for editing icons or widgets as illustrated in FIG. 7B.

Specifically, the control unit 180 may generate a control signal for displaying the editing screen 730, in response to the detected drag touch gesture or flicking gesture, and transmit the generated control signal to the second display unit 250 through the first wireless communication unit 116, the wiring part 242, and the second wireless communication unit 283 connected to the wiring part 242. Accordingly, the second home screen 720 of the second display unit 250 may be switched to the editing screen 730.

At this time, the first home screen 710 output to the first display unit 151 may be maintained in the current display state without any change.

As described above, execution screens of different applications can be displayed on a plurality of display areas according to the present disclosure and independently controlled by a single control unit, which may result in providing a more expanded display function to a user.

Figure 7C:
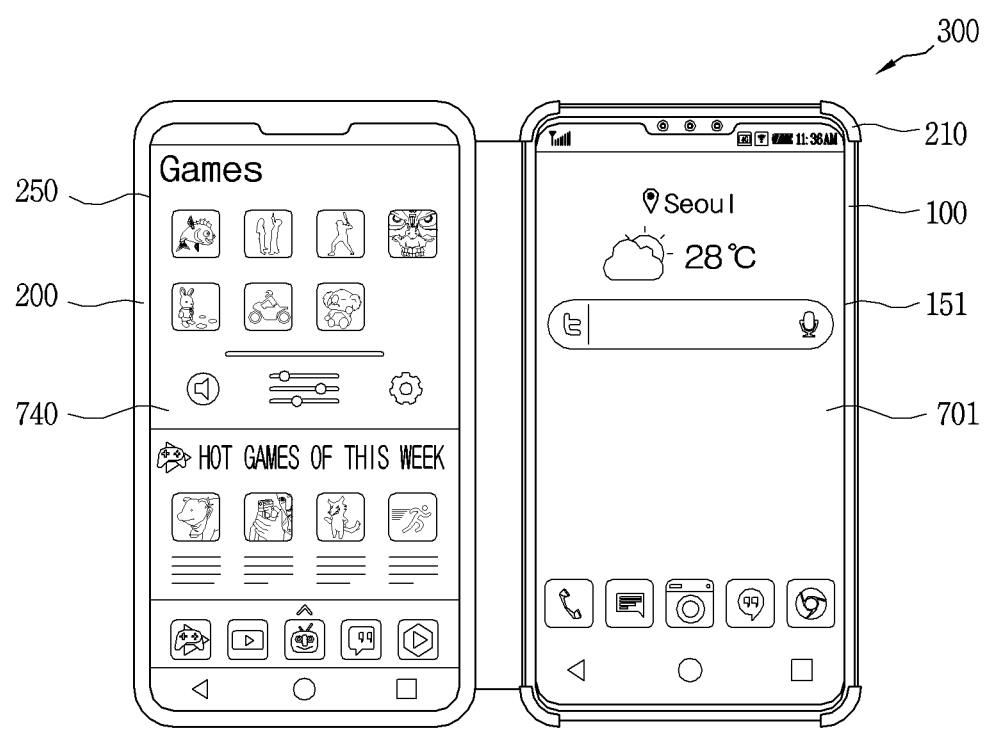

On the other hand, as illustrated in FIG. 7C, the second home screen 720 output on the second display unit 250 may be changed to a third home screen 740 having a layout in which icons, widgets, news, and contents are rearranged according to user preferences.

In this case, after opening the electronic device 300, the user can access a specific application through the home screen 701 having an original layout on the first display unit 151, or more quickly access a desired application through the third home screen 740 having a customized layout on the second display unit 250.

On the other hand, when different home screens are displayed on the first and second display units 151 and 250, the execution screens of the first and second applications may be displayed based on touch inputs applied to the home screens displayed on the first and second display units 151 and 250.

In this case, a task corresponding to an execution of the first application selected on the first home screen may be stored in the memory stack for the first display unit 151. And, a task corresponding to an execution of the second application selected on the second home screen may be stored in the memory stack for the second display unit 250.

In this way, as the memory stacks are allocated to the first and second display units 151 and 250, respectively, independent control can be achieved. However, when the second display unit 250 is switched to the inactive state because the operating current is not supplied any more to the second display unit 250, the memory stack separately allocated for the second display unit 250 may be deleted. Afterwards, when the second display unit 250 is switched back to the active state as the operating current is supplied, the memory stack may be reallocated.

Meanwhile, although not shown, in the state where the execution screen of the first application is displayed on the first display unit 151, when an execution request for the first application is received on the second display unit 250, the control unit 180 may maintain the display state of the first display unit 151 and output notification information for notifying that the first application cannot be executed on the second display unit 250 to the second display unit 250.

Similarly, even when an execution request for the second application is received on the first display unit 151 while the execution screen of the second application is displayed on the second display unit 250, the operation described above can be performed. However, a request for sending the execution screen of the first application displayed on the first display unit 151 to the second display unit 250 or importing the execution screen of the second application displayed on the second display unit 250 to the first display unit 151 may be allowed.

Hereinafter, various examples in which different applications are executed on the first display unit and the second display unit will be described with reference to FIGS. 8A, 8B, 8C, 8D, 8E, 8F, 8G, 8H, and 8I.

In this regard, in the electronic device 300 according to the present disclosure, the control unit 180 of the mobile terminal may allocate different memory stacks for tasks of the execution screens respectively displayed on the first and second display units 151 and 250.

In addition, the control unit 180 may control each memory stack to maintain the task of the execution screen of the second application displayed on the second display 250 while changing the task of the execution screen of the first application according to a control signal corresponding to the touch signal of the first touch.

In addition, the control unit 180 may control each memory stack to maintain the task of the execution screen of the first application displayed on the first display 151 while changing the task of the execution screen of the second application according to a control signal corresponding to the touch signal of the second touch.

Figure 8A:

For example, as illustrated in FIG. 8A, while watching a video 811 being reproduced through the second display unit 250, a home shopping search screen 812 of a related product can be provided through the first display unit 151. In this case, the video 811 displayed on the second display unit 250 may be continuously reproduced, independently of a screen control corresponding to a touch, a scroll input, or the like applied to the first display unit 151.

Figure 8B:
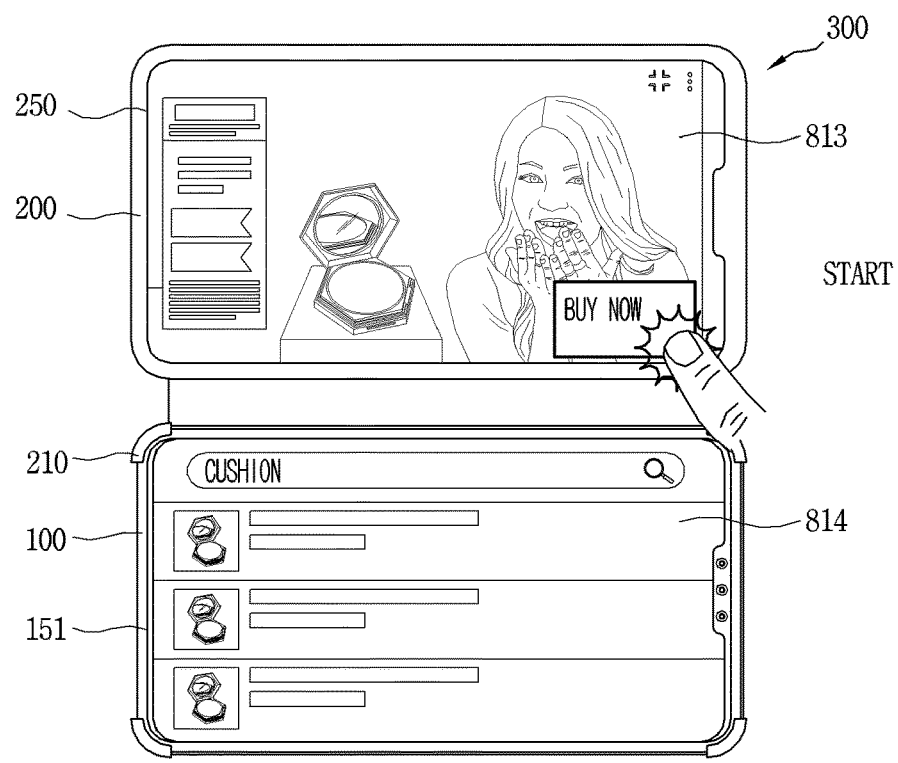
Figure 8C:
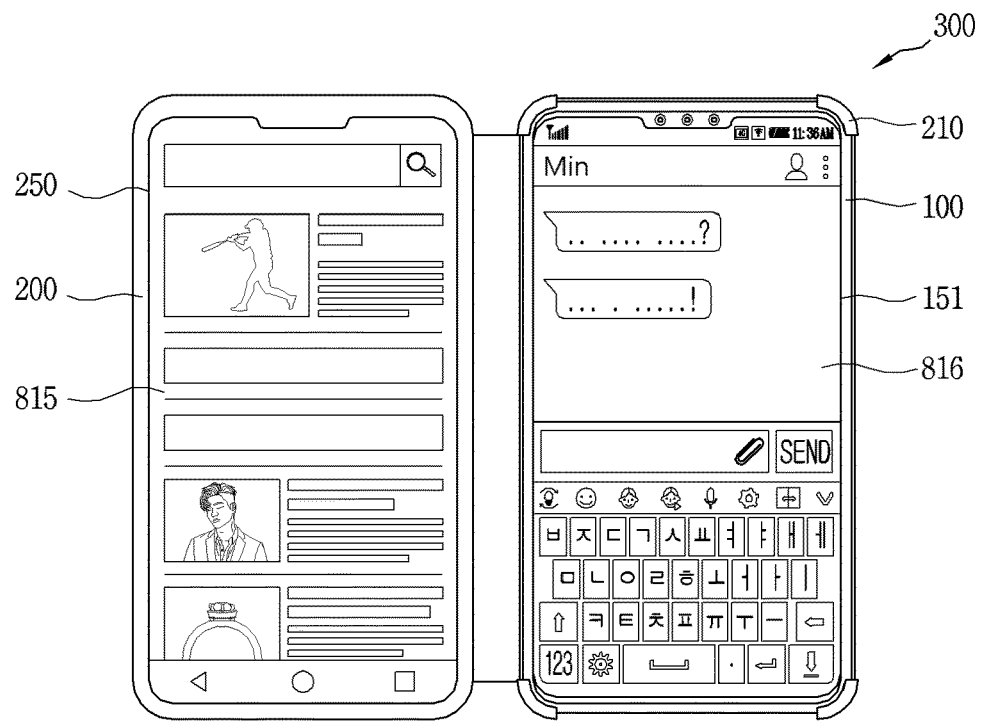

Also, for example, as illustrated in FIG. 8B, while performing a product purchase process using a product purchase screen 813 displayed on the second display unit 250, a price search screen 814 for the same product may be provided through the first display unit 151. As illustrated in FIG. 8C, web news search may be enabled through the second display unit 250 while exchanging messages using a message chat screen 816 provided through the first display unit 151.

Figure 8D:
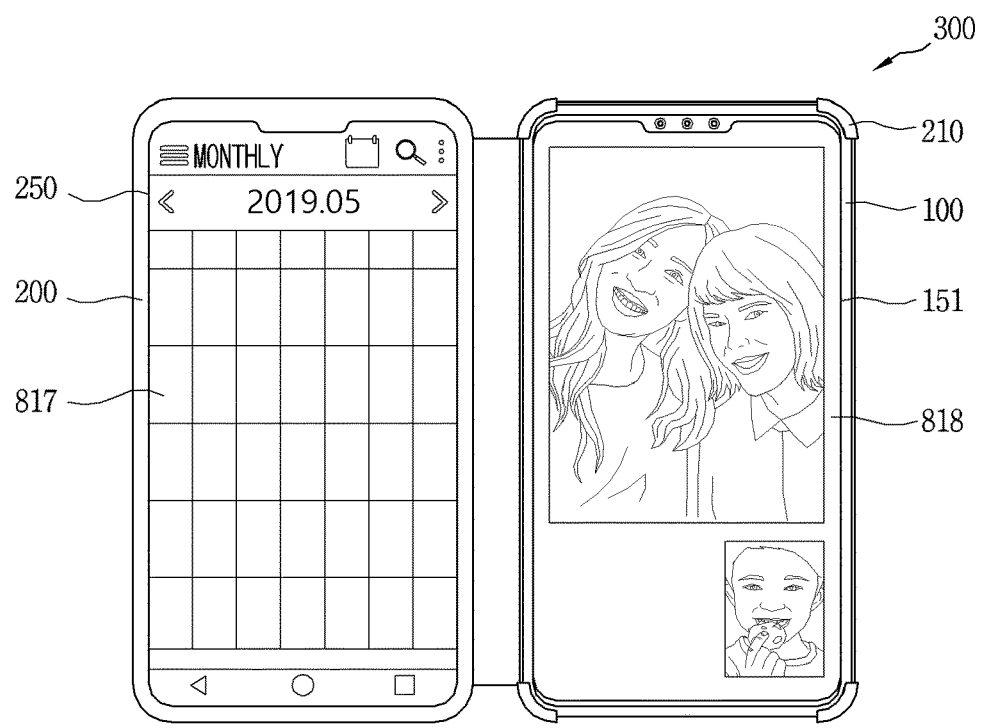
Figure 8E:
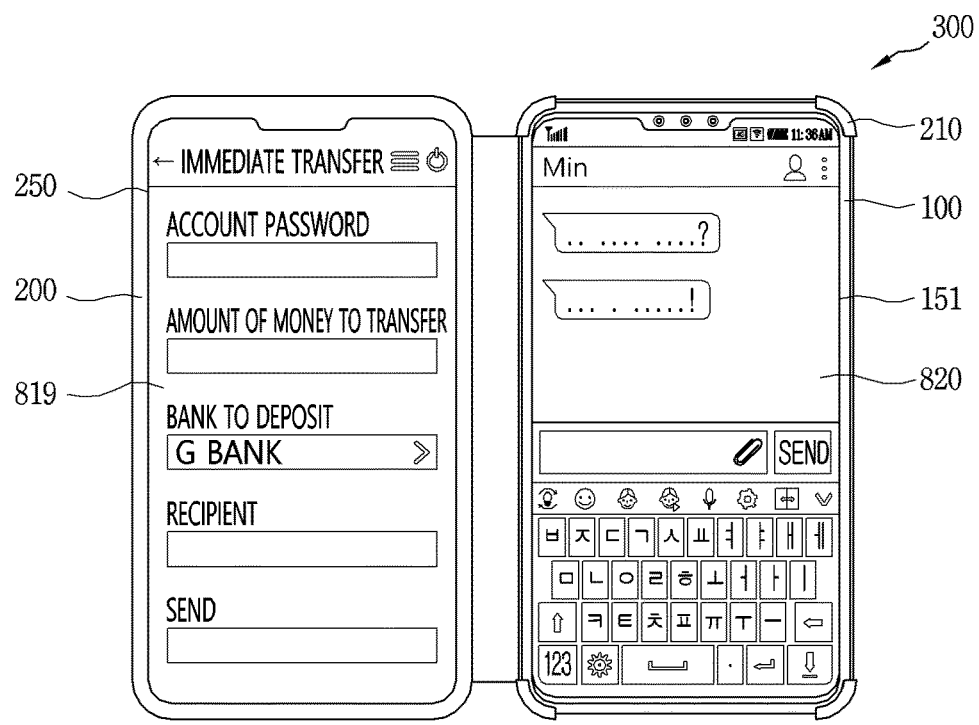
Figure 8F:

As illustrated in FIG. 8D, a video call 818 may be performed through the first display unit 151 and simultaneously a calendar screen 817 may be output through the second display unit 250 while checking a schedule. In addition, as illustrated in FIG. 8E, in order to share an account number as a message content while maintaining a message chat screen 820 of the first display unit 151, an execution screen 819 of a specific financial application may be output to the second display unit 250. Also, for example, as illustrated in FIG. 8F, prices, purchase conditions, etc. may be compared while checking different shopping mall screens 821 and 822 through the first and second display units 151 and 250 at the same time.

Figure 8G:
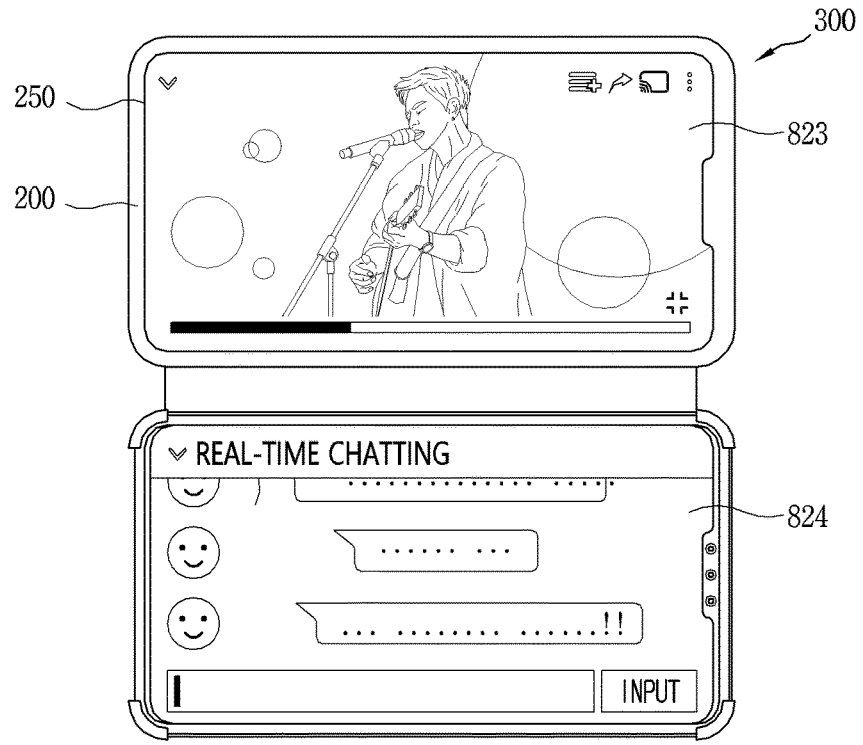
Figure 8H:
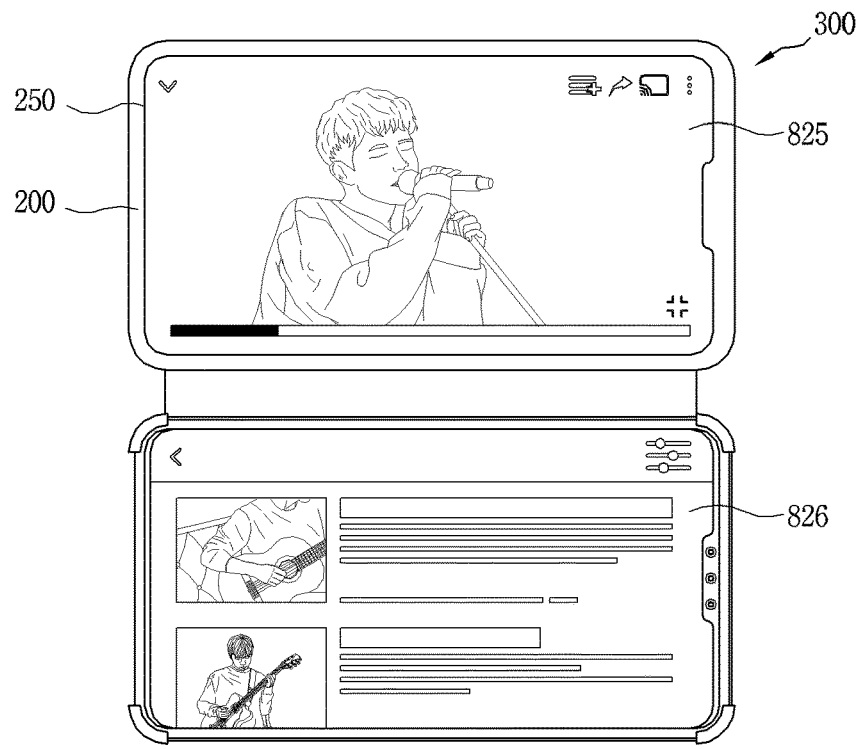

As illustrated in FIG. 8G, while watching a video 823 through the second display unit 250, chatting related to the video 823 may be performed using a multi-party message screen 824 of the first display unit 824, and the video 823 and the multi-party message screen 824 may be provided on a larger screen than before. As illustrated in FIG. 8H, while viewing a specific YouTube play screen 825 through the second display unit 250, a related YouTube video playlist 826 may be provided through the first display unit 824. Accordingly, the currently viewed YouTube play screen 825 and the related YouTube video playlist 826 can be provided separately on larger screens, thereby improving user's visibility and providing convenience in operation or manipulation.

As another example, FIG. 8I illustrates an implementation in which screen information associated with information selected from an execution screen displayed on the first display unit 151 is provided through the second display unit 250.

To this end, the control unit 180 of the electronic device 300 according to the present disclosure may recognize information selected on the execution screen of the first application according to the first touch applied to the first display unit 151. Then, the control unit 180 may recognize the second touch that is applied after the first touch to an input area included in the execution screen of the second application displayed on the second display unit 250, and display the recognized information according to the first touch by inserting it in the input area displayed on the second display unit 250.

As illustrated in upper drawings of FIG. 8I, a content screen 828 including a plurality of texts may be displayed on the first display unit 151, and a search screen 827 including an input area (or search word input area) may be displayed on the second display unit 250.

At this time, when a specific text is selected through the first touch (e.g., a long touch input) on the content screen 828 displayed on the first display unit 151, a guide image 840 indicating the selection of the specific text may be displayed. The selected specific text may be copied automatically or through a context menu displayed simultaneously with the selection.

Thereafter, when the second touch (e.g., a long touch input) is applied to an input area 850 displayed on the second display unit 250, the control unit 180 of the mobile terminal may control a copied specific text (e.g., 'Antarctica') to be automatically pasted on the input area 850.

To this end, when the touch signal of the second touch applied to the second display unit 250 is received on the mobile terminal through the second wireless communication unit 283 and the wiring part 242, the control unit 180 may recognize that a touch point corresponding to the touch signal of the second touch corresponds to the input area, and transmit the text copied according to the first touch and a control signal for pasting it to the second display unit 250 through the first wireless communication unit 116, the wiring part 242, and the second wireless communication unit 283.

In addition, as illustrated in lower drawings of FIG. 8I, the control unit 180 of the mobile terminal may automatically execute a search function, in response to the copied text being pasted on the input area 850 of the second display unit 250. Accordingly, since a search result related to the information selected on the first display unit 151 is output to the second display unit 250, the user can search and obtain related additional information through a different screen while maintaining the display state of the first display unit 151.

As described above, in the present disclosure, related screens can be simultaneously checked if necessary, and additional information or detailed information can be easily and quickly checked through a different screen while maintaining a currently viewed screen.

Hereinafter, a method of setting a wallpaper in an expanding manner on the first display unit 151 or the second display unit 250 will be described in detail, with reference to FIG. 9.

The wallpaper means a 'background screen', and in this case may be defined as a background of each home screen when home screens are displayed respectively on the first and second display units 151 and 250.

The wallpaper may be deleted, changed, or edited by user settings, and may be designated through a gallery application, camera shooting, or web search in addition to pre-stored images. Hereinafter, 'wallpaper' and 'background of a home screen' may be used as the same meaning.

A wallpaper displayed on the first display unit 151 and a wallpaper displayed on the second display unit 250 may be different from each other. In addition, a wallpaper set through a setting screen displayed on the first display unit 151 may be applied to the first display unit 151. And, a wallpaper set through a setting screen displayed on the second display unit 250 may be applied to the second display unit 250. The present disclosure has implemented to connect all of the plurality of display units 151 and 250 to apply one wallpaper, in order to maximize user experience of expanding a display area.

Figure 9:
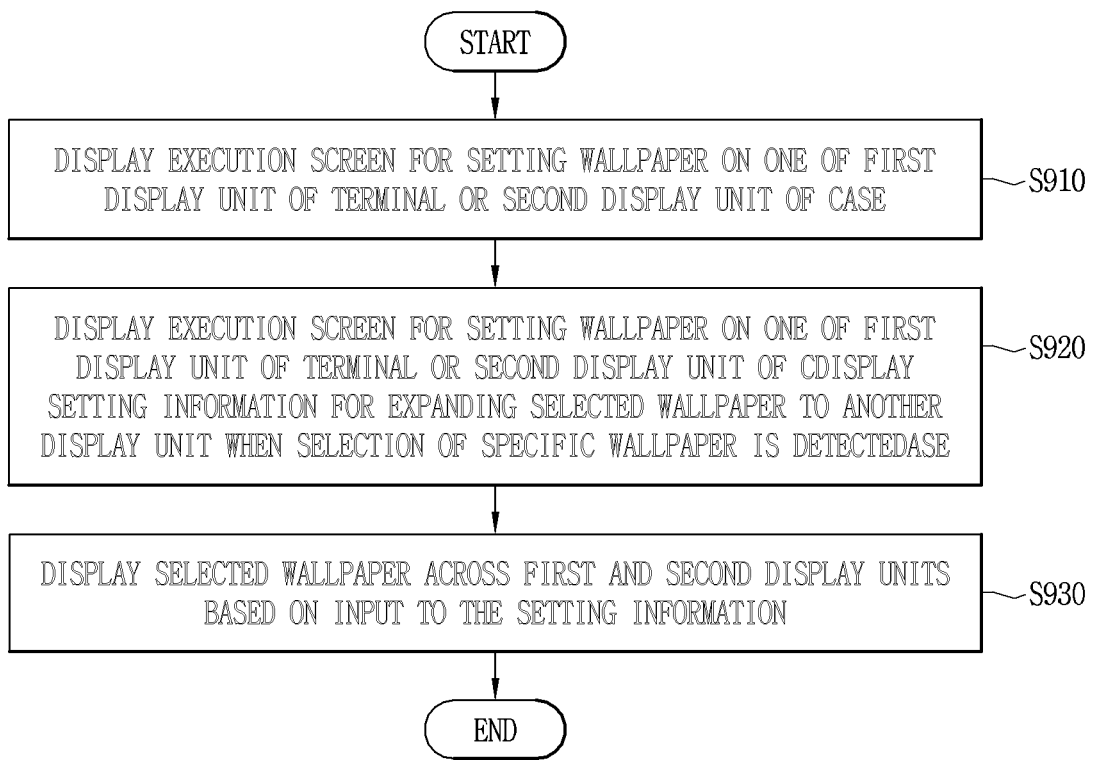
FIG. 9 is a flowchart illustrating a method of setting a wallpaper by expanding it in a first display unit or a second display unit, in an electronic device according to the present disclosure.

Referring to FIG. 9, the control unit 180 of the mobile terminal may display an execution screen for setting a wallpaper on either the first display unit 151 of the mobile terminal or the second display unit 250 of the case (S910). This may be performed through a user input, and the control unit 180 of the mobile terminal may recognize a position of a display unit on which an execution screen for setting the wallpaper is displayed.

Next, when a selection of a specific wallpaper on the execution screen for setting the wallpaper is detected, the control unit 180 may display setting information for expanding the selected wallpaper to another display unit (S920).

Specifically, when a wallpaper to be changed is selected through the first display unit 151, setting information regarding whether to expand the corresponding wallpaper to the second display unit 250 may be displayed on the first display unit 151. Alternatively, when a wallpaper to be changed is selected through the second display unit 250, setting information regarding whether to expand the corresponding wallpaper to the first display unit 151 may be displayed on the second display unit 250. The setting information may include information regarding a display unit to which the selected wallpaper is to be expanded, an image of the selected wallpaper, and a user response request.

In the state in which the setting information is displayed, the control unit 180 may display the selected wallpaper by connecting the first and second display units 151 and 250 based on an input applied to the displayed setting information (S930). Specifically, the selected wallpaper may be expanded up to another display unit or applied only to a current display unit, according to a user input corresponding to a user response request included in the setting information.

Hereinafter, each process of the flowchart of FIG. 9 will be described in more detail with reference to FIGS. 10A, 10B, 10C, and 10D.

Figure 10A:
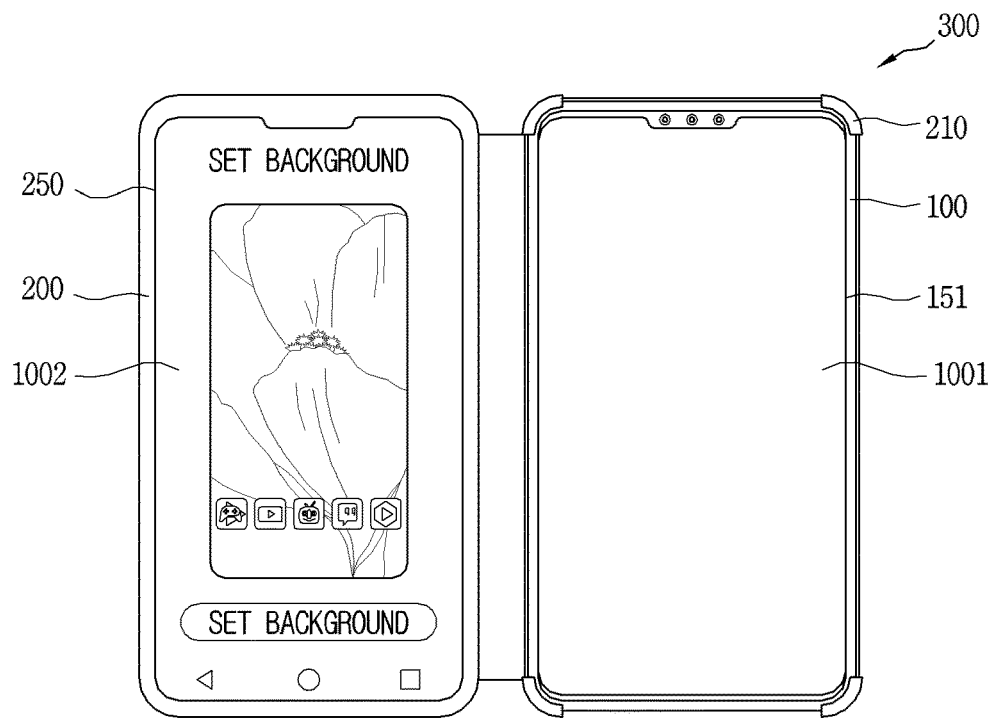
FIGS. 10A, 10B, 10C, 10D, 10E, 11A, and 11B are exemplary conceptual views related to the flowchart of FIG. 9.
Figure 10B:
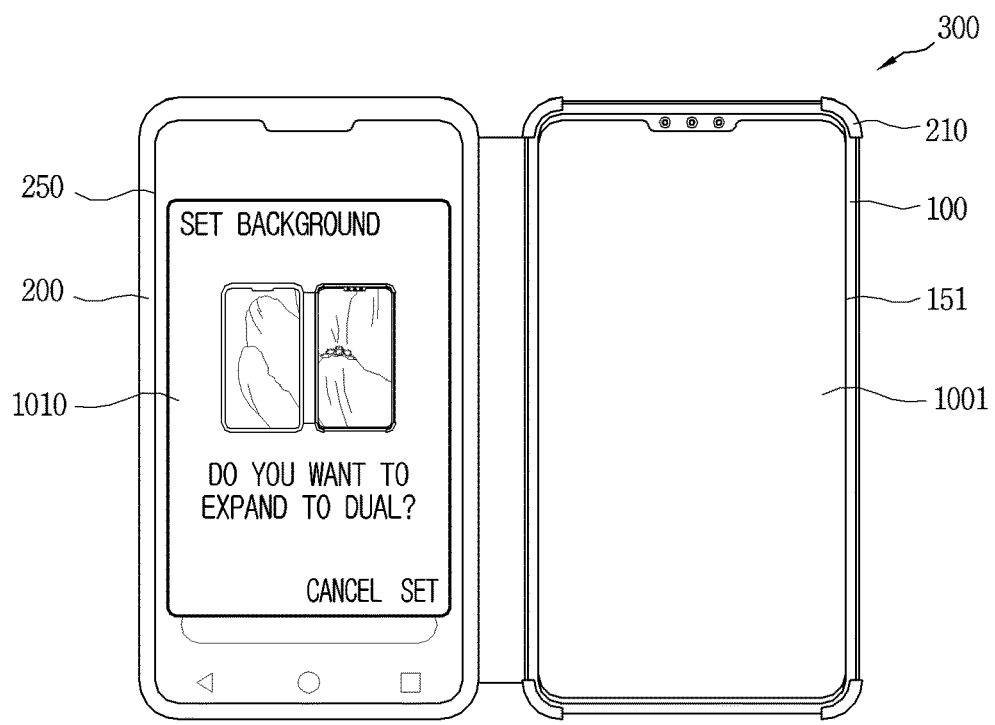
Figure 10C:
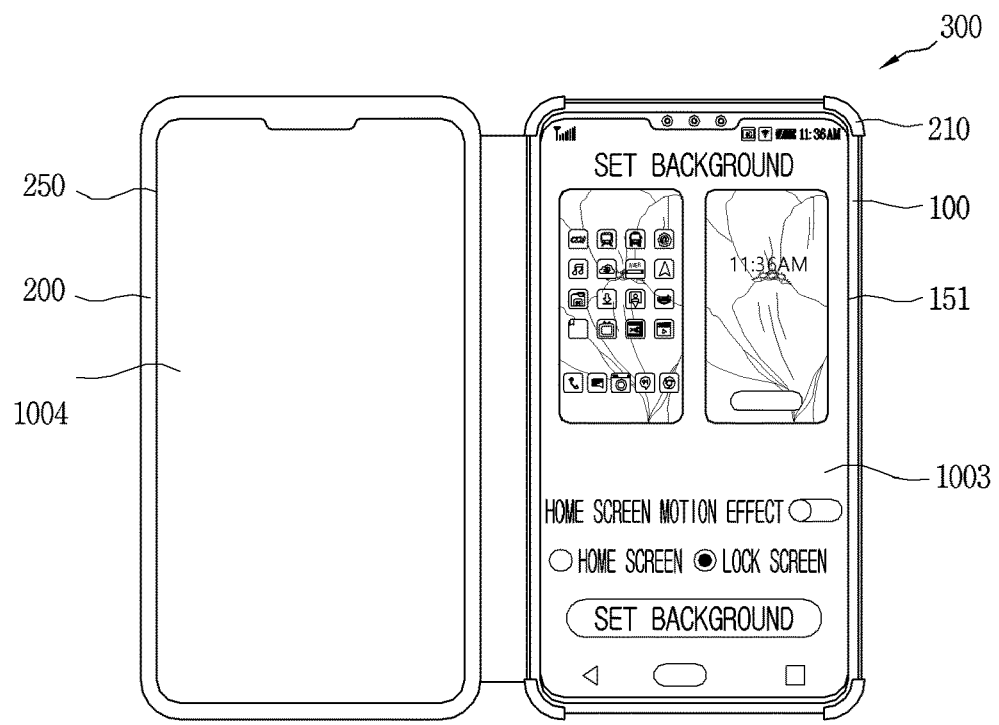
Figure 10D:
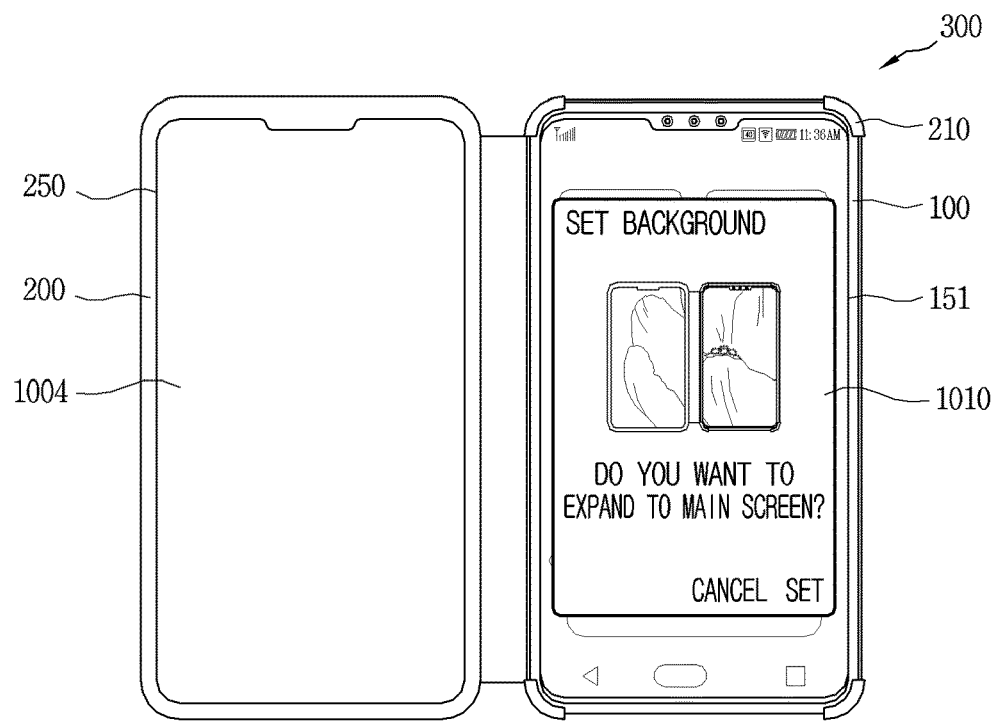

FIGS. 10A and 10B illustrate examples of expanding the selected wallpaper through the second display unit 250, and FIGS. 10C and 10D illustrate examples of extending the selected wallpaper through the first display unit 151.

Specifically, as illustrated in FIGS. 10A and 10C, in the electronic device 300 according to the present disclosure, the control unit 180 of the mobile terminal may detect a selection of a specific wallpaper in a state in which a third execution screen 1002, 1003 for setting a wallpaper is displayed on one of the first display unit 151 and the second display unit 250. At this time, as illustrated in FIG. 10C, on the first display unit 151, a wallpaper of a home screen and a wallpaper of a lock screen may be set differently or equally.

Next, as illustrated in FIGS. 10B and 10D, setting information 1010 for expanding the selected wallpaper to another display unit 151 or 250 may be displayed on the third execution screen. In addition, the control unit 180 may change the wallpaper setting of the first and second display units 151 and 250, based on a user input to the setting information, such that the selected wallpaper can be displayed across both the first and second display units 151 and 250.

For example, when the user input to the displayed setting information 1010 is a positive response (e.g., 'set' menu), the control unit 180 may set the selected wallpaper to be displayed across both the first and second display units 151 and 250. On the other hand, when a user input to the displayed setting information 1010 is a negative response (e.g., 'cancel' menu), the control unit 180 may apply the selected wallpaper only to the current display unit 151 or 250.

In this case, the expanded application of the selected wallpaper may be irrespective of the display state of another display unit 151 or 250 on which the setting information 1010 is not displayed. Accordingly, once the mobile terminal 100 is coupled to the case, the control unit 180 can expand the selected wallpaper although the another display unit 151 or 250 is in an inactive state, a home screen is already output, or another application is being executed.

Figure 10E:
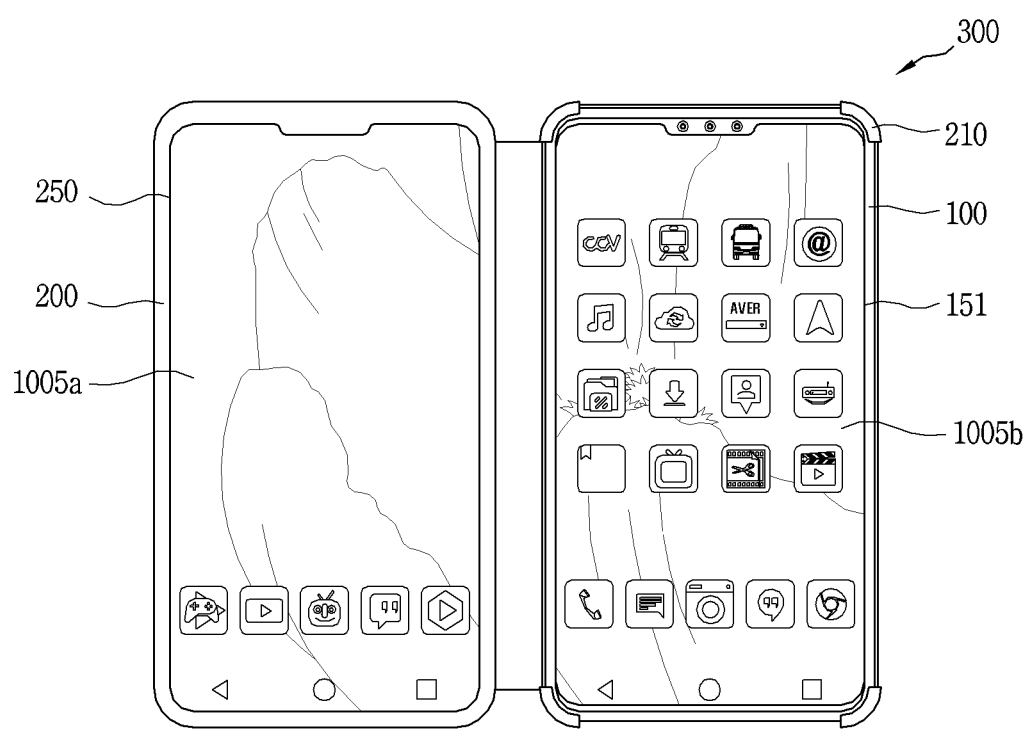

In this way, when the selected wallpaper is expanded, as illustrated in FIG. 10E, even when different home screens are output on the first display unit 151 and the second display unit 250, one connected background screen 1005a and 1005b can be displayed.

As described above, in the present disclosure, since the background screen set in one display area can be set to be continuously expanded to another display area, more expanded view can be provided upon outputting a home screen. Also, settings for a plurality of display areas can change through one setting operation to thereby provide convenience to the user.

Meanwhile, although not shown, when a new wallpaper is set in one of the first display unit 151 or the second display unit 250, the one connected background screen 1005*a* and 1005*b* may be automatically separated. Accordingly, the one connected background screen 1005*a* and 1005*b* can be reduced, so as to be displayed on only the first display unit 151 or the second display unit 250.

Also, in one example, there may be a case in which the change in a wallpaper setting executed in one display unit cannot be applied to another display unit.

Figure 11A:
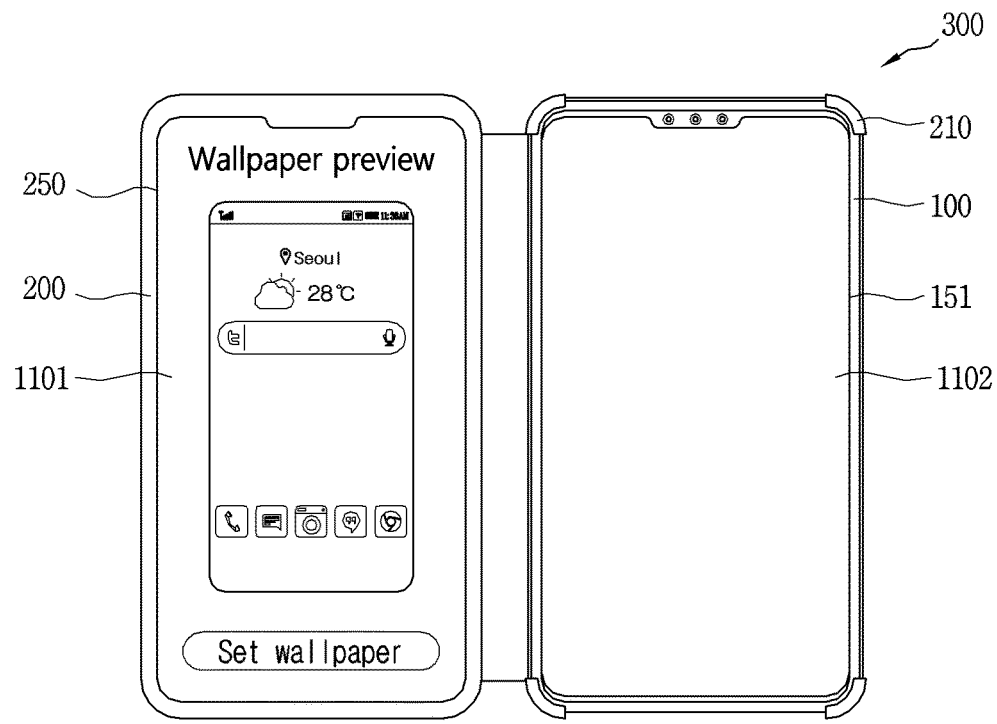
Figure 11B:
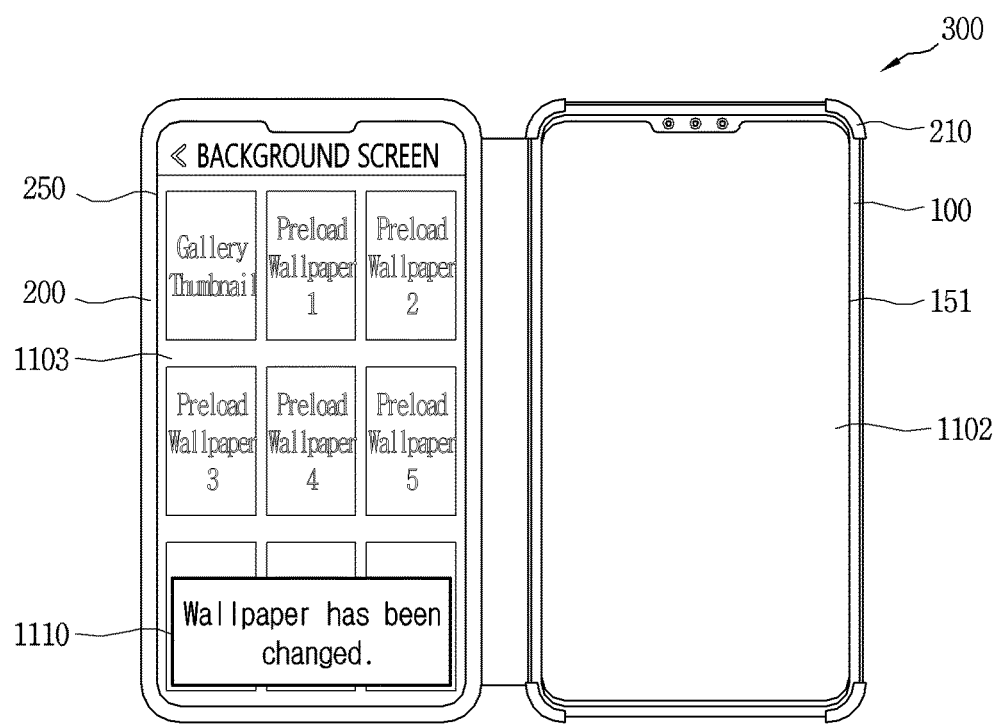

For example, as illustrated in FIGS. 11A and 11B, a first execution screen 1102 may be displayed on the first display unit 151 and a third execution screen 1101 for setting a wallpaper may be displayed on the second display unit 250. In the state, when an application menu ('Set wallpaper') for a selected wallpaper is selected, the setting information may not be output but a list screen 1103 of a previous step may be output. At this time, notification information 1110 notifying that the wallpaper of the second display unit 250 has been changed may be output on a lower end of the list screen 1103. Here, a state in which a selected wallpaper cannot be expanded may not mean a state in which a setting application has been executed on the first display unit 151.

Hereinafter, operation processes of a method of displaying an initial state of the second display unit 250 as a user-customized screen when the electronic device according to the present disclosure is switched from a closed state to an open state will be described in detail, with reference to FIG. 12.

Figure 12:
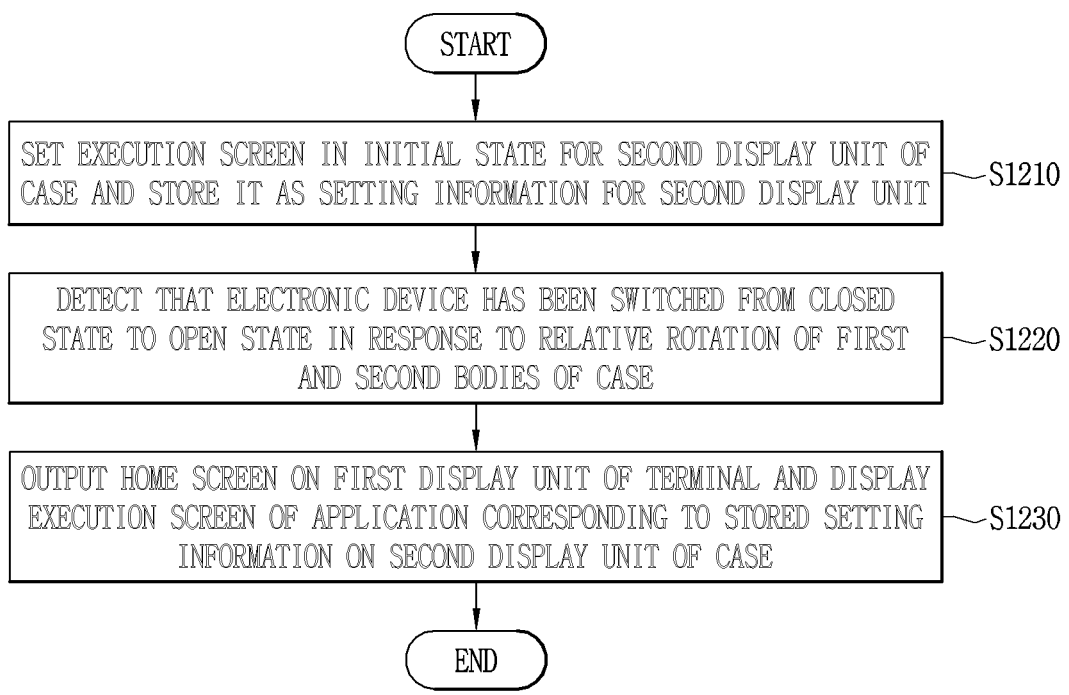
FIG. 12 is a flowchart illustrating a method of displaying a preset execution screen as an initial screen of a second display unit upon switching to an open state, in an electronic device according to the present disclosure.

As illustrated in FIG. 12, the electronic device 300 according to the present disclosure may set an execution screen in an initial state for the second display unit 250 of the case by the control unit 180 of the mobile terminal. Then, the setting may be stored as setting information for the second display unit 250 (S1210).

Here, the execution screen in the initial state may mean screen information displayed first when the second display unit 250 is switched from an inactive state to an active state. In the present disclosure, there may be no limitation on the type of the execution screen in the initial state.

For example, the execution screen may be screen information corresponding to an execution of a specific application (e.g., a message application, an SNS application, a camera application, a web application, etc.). In addition, the execution screen may be screen information entered into a specific step after an execution of a specific application. As a specific example, the execution screen may also be set as a chat screen entered into a chat room with a specific person in a message application.

To this end, the execution screen in the initial state of the second display unit 250 may be set through the first display unit 151. In addition, the setting information related to the execution screen in the initial state for the second display unit 250 may not be stored in a memory stack allocated for the second display unit 250 but may be stored in a stationary memory stack or a specific cell of the stack.

Data related to the stored setting information may be transmitted to the second display unit 250 together with a generated control signal through the wiring part 242 and the second wireless communication unit 283 when the control signal for switching the second display unit 250 to an active state is generated. Accordingly, the second display unit 250 can output a specific execution screen set to an initial state as soon as a screen is turned on.

Next, the control unit 180 of the mobile terminal may detect that the electronic device according to the present disclosure has been switched from the closed state to the open state based on a sensing value received through the connecting portion for connecting the first and second bodies of the electronic device or a sensor provided in the connecting portion, or a sensing value of a light sensor (S1220).

That is, the control unit 180 may recognize the closed state in which the first display unit 151 is covered by the second display unit 250 has been switched to the open state in which both the second display unit 250 and the first display unit 151 are all exposed based on the sensing value.

In this way, when the electronic device is switched from the closed state to the open state, the control unit 180 may switch the first and second display units 151 and 250 from the inactive state to the active state. To this end, as the electronic device is switched to the open state, the control unit 180 may control the mobile terminal to supply the operating current to the second display unit 250.

As such, when the first and second display units 151 and 250 are activated, the control unit 180 may output a home screen to the first display unit 151. Then, the execution screen of the application corresponding to the stored setting information may be directly output to the second display unit 250 (S1230).

Accordingly, a frequently executed task can be directly performed through the second display unit 250 without outputting a home screen. In addition, since the original home screen can be provided through the first display unit 151, the user can selectively perform the frequently executed task or another task without additional manipulation.

Figure 13A:
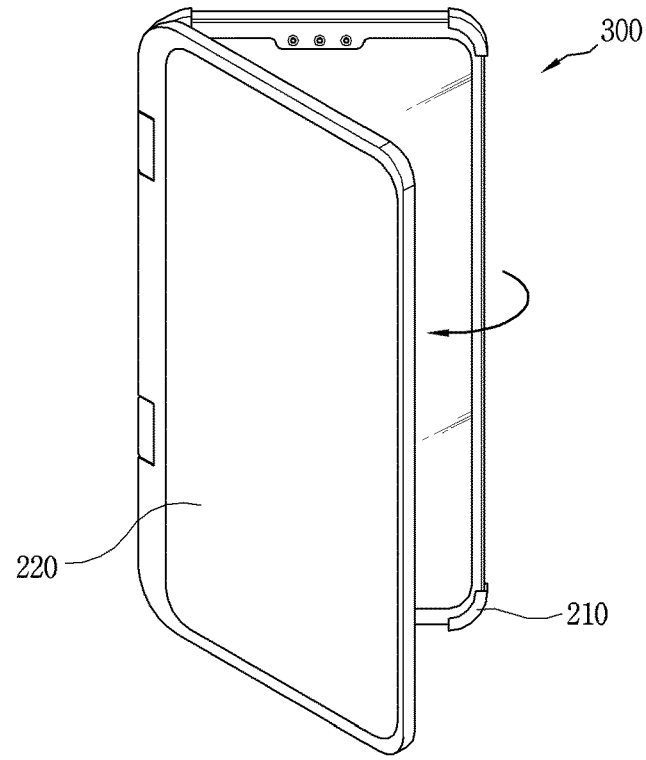
FIGS. 13A, 13B, 13C, and 13D are exemplary conceptual views related to the flowchart of FIG. 12.

Referring to FIG. 13A, in the closed state in which the second display unit 250 provided on the second body 220 of the electronic device 300 covers the first display unit 151 coupled to the first body 210 of the case, switching to the open state in response to the relative rotation of the first and second bodies 210 and 220 may be detected.

The switching from the closed state to the open state may be detected through a light sensor provided in the mobile terminal, the connecting portion 230, or a sensor separately provided in the connecting portion 230. In addition, the fully open state or the bent state among those aforementioned open states may be detected through the connecting portion 230 or a sensor separately provided in the hinge body 233 or the hinge shaft 234 of the connecting portion 230.

Figure 13B:
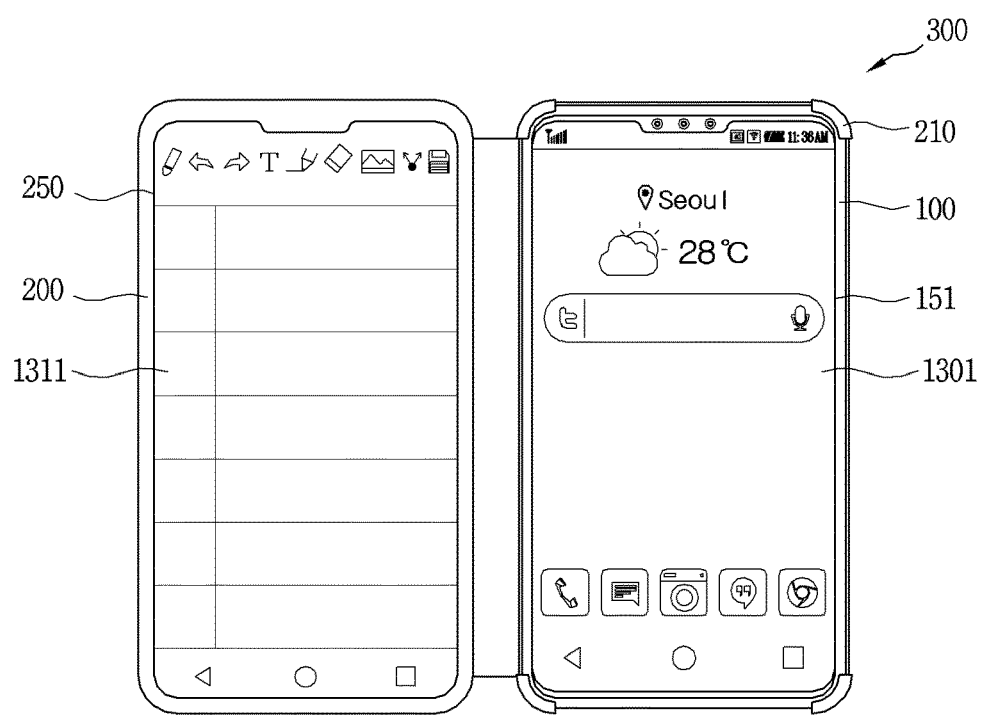
Figure 13C:
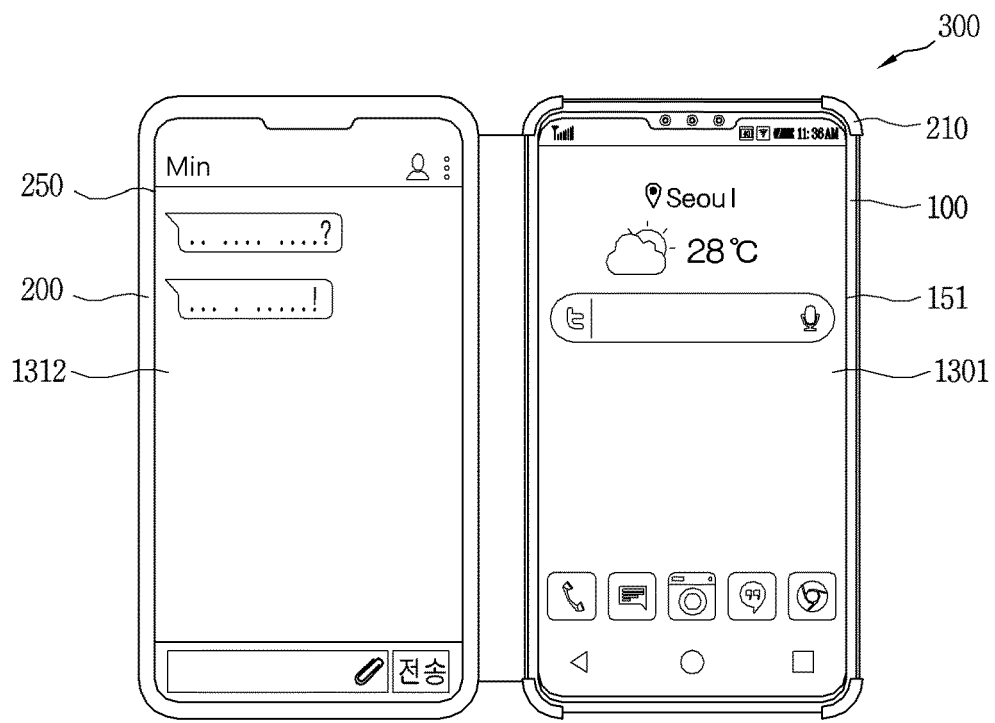
Figure 13D:
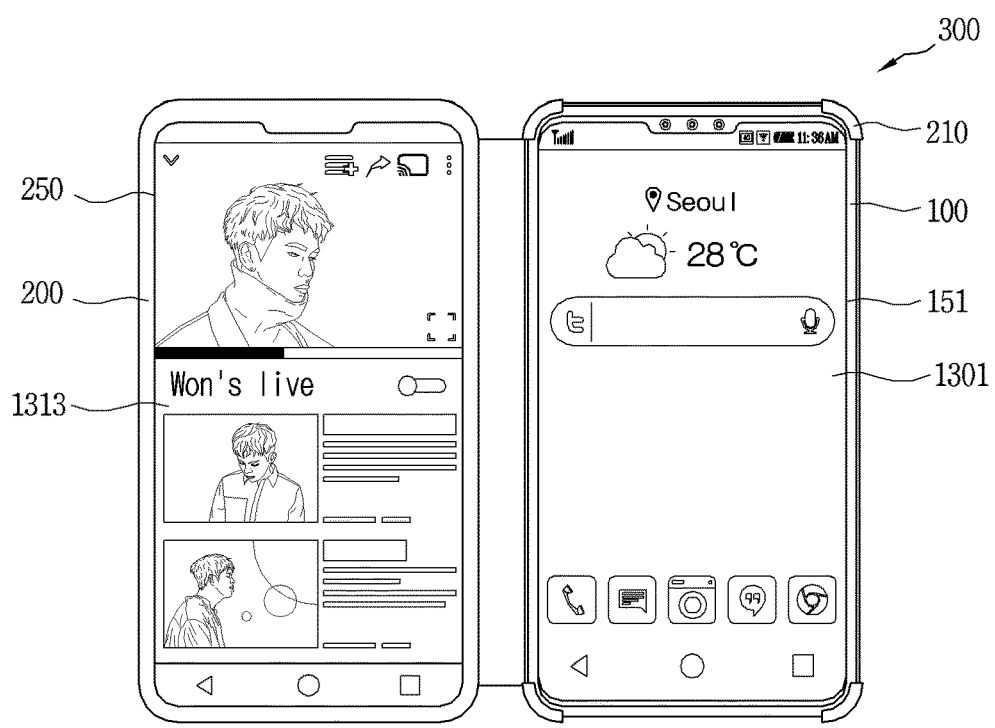

In this manner, when the electronic device is in the open state (or in the fully opened state or the bent state), both the first and second display units 151 and 250 may be switched to the active state, such that a home screen 1301 can be displayed on the first display unit 151 and a memo screen 1311 set to an initial state can be displayed on the second display unit 250, as illustrated in FIG. 13B. Alternatively, as an initial state screen of the second display unit 250, a chat screen 1312 with a specific person may be displayed as illustrated in FIG. 13C or a specific video screen 1313 may be displayed as illustrated in FIG. 13D.

Also, although not shown, when the electronic device 300 is switched from the closed state to the open state, the control unit 180 may maintain the second display unit 250 in the inactive state. In this case, when a preset touch input (e.g., a double tap) is applied to the second display unit 250, a touch signal of the touch input may be transmitted to the control unit 180 of the mobile terminal, and thus a corresponding control signal may be generated.

Specifically, the control unit 180 may determine whether the touch signal of the touch input corresponds to a preset touch input, and generate a control signal for switching the second display unit 250 to the active state. The control unit 180 may then transmit the generated control signal to the second display unit 250 together with the data associated with the stored setting information. Accordingly, a specific execution screen set to an initial state can be output as soon as the screen of the second display unit 250 is turned on.

Meanwhile, the connecting portion 230 of the electronic device 300 may be configured such that the first and second bodies 210 and 220 rotate relative to each other. In addition, the control unit 180 of the mobile terminal may determine whether to activate the second display unit 250 and to display the execution screen of the application according to the setting information stored as the initial state screen of the second display unit 250, according to a rotation angle of the connecting portion 230 that is detected in the open state.

Here, the rotation angle of the connecting portion 230 may refer to an angle formed by the first and second bodies 210 and 220.

Specifically, for example, the control unit 180 may switch only the first display unit 151 to the active state while maintaining the inactive state of the second display unit 250 when the rotation angle of the connecting portion 230 is in a first range (e.g., 45 degrees to 60 degrees) in the open state. In addition, the control unit 180 may switch both the first display unit 151 and the second display unit 250 to the active state when the rotation angle of the connecting portion 230 is in a second range (e.g., 90 degrees to 120 degrees) exceeding the first range in the open state. Subsequently, the control unit 180 may display the execution screen of the application set to the initial state screen on the second display unit 250 when the rotation angle of the connecting portion 230 is in a third range (e.g., 140 degrees to 180 degrees) exceeding the second range.

As such, in the present disclosure, different operations may be performed with respect to the plurality of display units 151 and 250 according to the degree of rotation of the connecting portion 230 in the open state of the electronic device.

Figure 14A:
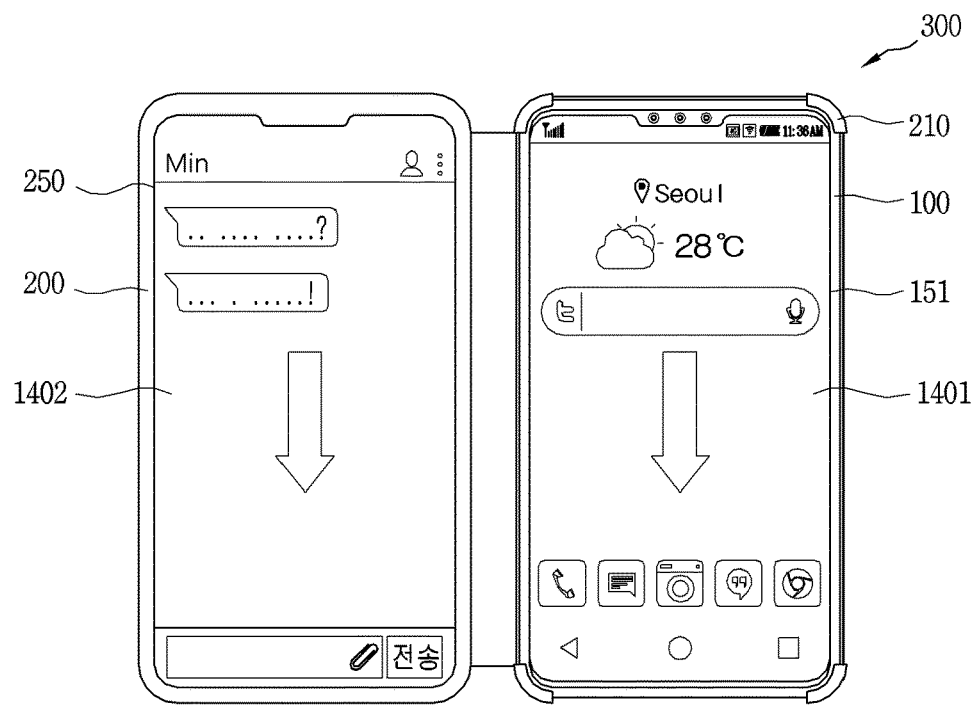
FIGS. 14A, 14B, and 14C are views illustrating changes in display directions of first and second display units, in response to additional relative rotation of first and second bodies in an open state, in an electronic device according to the present disclosure.
Figure 14B:
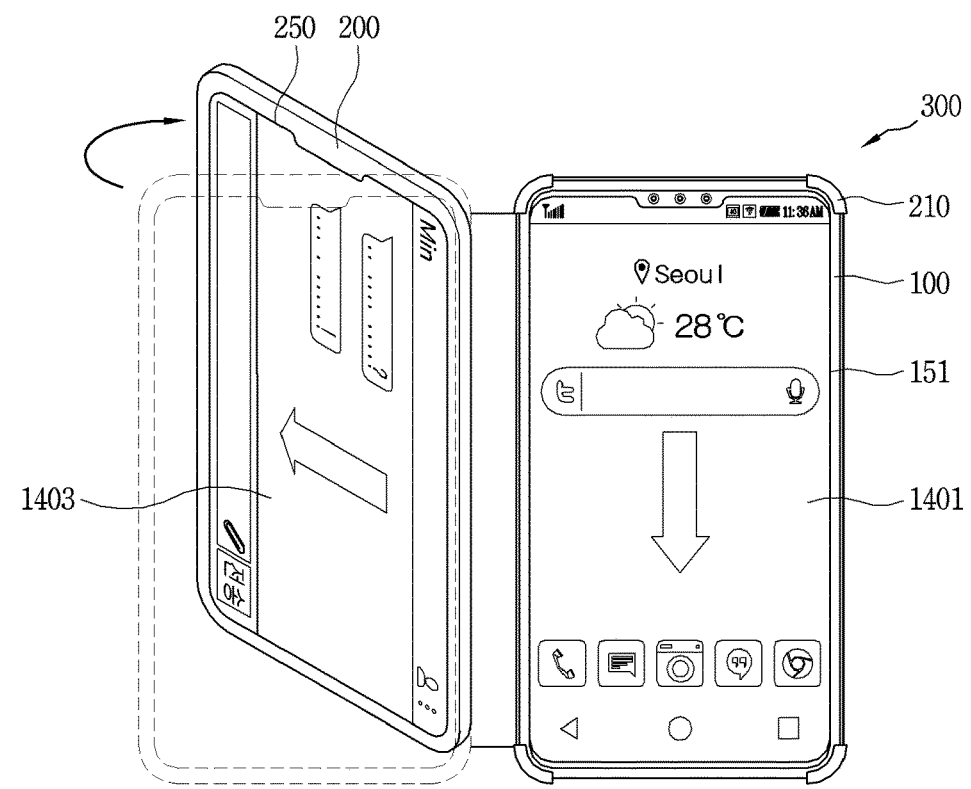
Figure 14C:
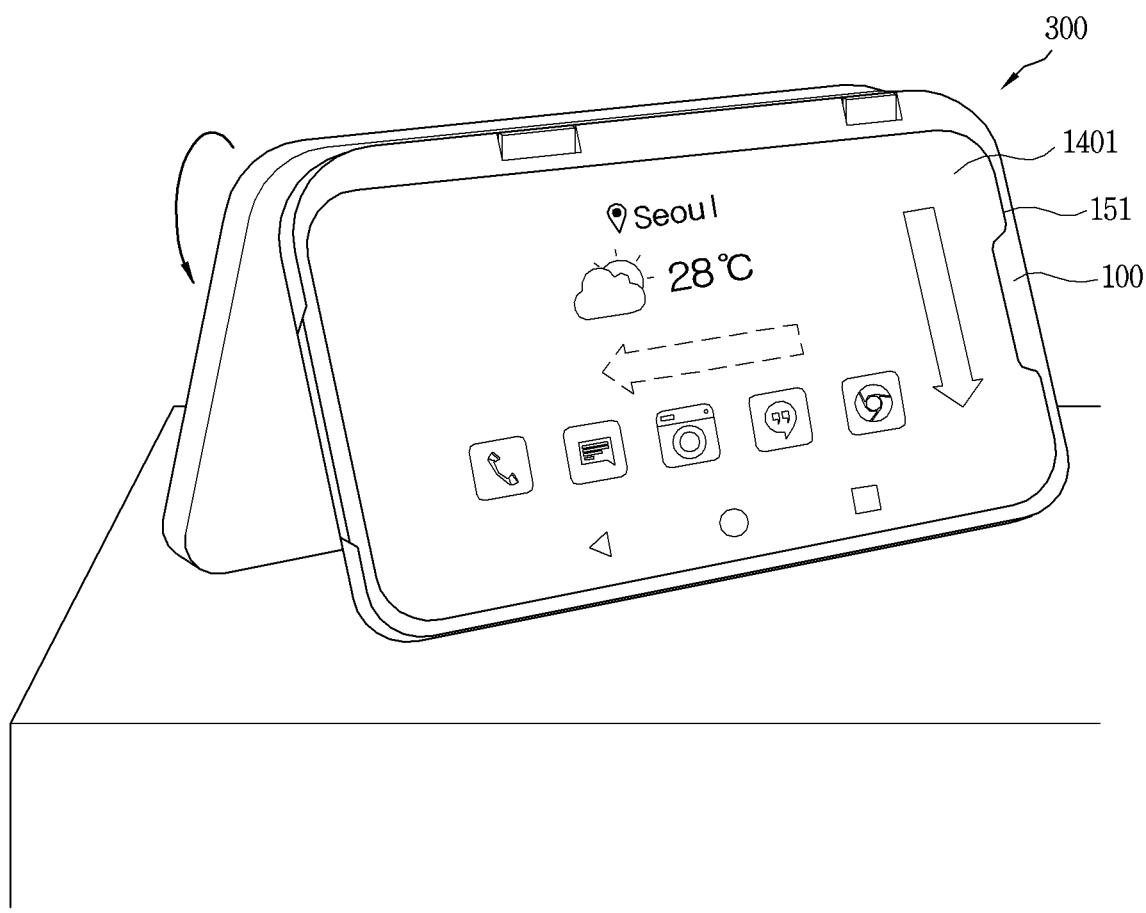

Hereinafter, FIGS. 14A, 14B, and 14C are views illustrating changes in display directions of first and second display units, in response to additional relative rotation of first and second bodies in an open state, in an electronic device according to the present disclosure.

Here, a description will be given of a change in display directions of different screen information displayed on the first display unit 151 and the second display unit 250 when the 'bent state' or 'fully open state' defined above is detected.

When the first and second bodies 210 and 220 relatively rotate within a range that is greater than 180 degrees and less than 360 degrees, this open state may be defined as a "bent state". As such, the "bent state" in which the first body 210 is bent toward the rear side of the case may be detected through the connecting portion for connecting the first and second bodies 210 and 220 or a sensor separately provided in the connecting portion. In addition, when the first body 210 further relatively rotates toward the rear surface of the case from the bent state of the first and second bodies 210 and 220 and thus the first body 210 and the second body 220 completely overlap each other toward their rear surfaces, this open state may be defined as a "fully open state".

Referring to FIG. 14A, in the 'open state' in which the rotation angle of the connecting portion 230 corresponds to at least the third range, the first display unit 151 and the second display unit 250 may display different execution screens 1401 and 1402 in a vertical direction.

Afterwards, when the second body 220 on which the second display unit 250 is disposed further rotates toward the rear surface so as to be in the 'bent state', as illustrated in FIG. 14B, the execution screen 1401 displayed on the first display unit 151 may maintain its vertical display direction, and the display direction of the execution screen 1402 displayed on the second display unit 250 may be changed to a horizontal direction (1403).

This may reflect that the bent state, when it is detected by the control unit 180 of the mobile terminal, can be changed to a state in which the user puts the electronic device 300 down on a floor. Afterwards, when it is detected through a gyro sensor and an acceleration sensor provided on the mobile terminal 100 that the posture of the electronic device has changed to the state placed on the floor as illustrated in FIG. 14C, the horizontal display direction of the second display unit 250 may be maintained, and the display direction of the execution screen 1401 displayed on the first display unit 151 may also be changed to the horizontal direction.

That is, the control unit 180 may control the display direction of at least one of the first and second display units to be rotated to a direction corresponding to the bent state.

On the other hand, when it is detected that the state in which the first and second display units 151 and 250 are displayed in the different display directions as illustrated in FIG. 14B is switched to the fully open state, the display direction (vertical direction) of the first display unit 151 may be maintained and the display direction of the second display unit 250 may be switched back to the horizontal direction.

In addition, the examples may be implemented such that the display directions of the first and second display units 151 and 250 can be rotated to different directions according to types of contents on execution screens displayed on the first and second display units 151 and 250 or a user setting.

As described above, in a mobile terminal and an electronic device having the mobile terminal according to the present disclosure, different screens displayed on a plurality of display areas can be independently controlled, and related screens can be simultaneously checked if necessary. A background screen set in one display area can be expanded to be connected to another display area. When the electronic device according to the present disclosure is switched from a closed state to an open state, a second display unit provided on a case can be set to output a screen desired by a user as an initial state screen. Accordingly, the user experience of the electronic device including the mobile terminal and the case coupled to the mobile terminal can be expanded, and usability can thusly be improved.

The invention claimed is:
1. An electronic device comprising a mobile terminal and a case to which the mobile terminal is coupled,
   wherein the mobile terminal comprises:
      a terminal body coupled to the case; and
      a first display unit coupled to the case,
   wherein the case comprises:
      a first body to accommodate at least a portion of the terminal body;
      a second body on which a second display unit is disposed;
      a wiring part electrically connecting the first body and the second body to transmit data received from the mobile terminal to the second display unit; and
      a wireless communication unit connected to the wiring part to transmit and receive signals to and from the mobile terminal,
   wherein the first and second display units have one of a closed state in which the first display unit is covered by the second display unit and an open state in which the first display unit is not covered by the second display unit, wherein a control unit of the mobile terminal is configured to:
- set an execution screen in an initial state for the second display unit to store as setting information of the second display unit,
- detect that the closed state is switched to the open state according to a relative rotation of the first body and the second body, and switch the first display unit from an inactive state to an active state,
- display a home screen on the first display unit when switched from the inactive state to the active state of the first body and the second body,
- determine whether a touch input corresponds to a preset touch input applied to the second display unit, generate a control signal for switching the second display unit to the active state, transmit the generated control signal to the second display unit with data associated with the stored setting information, and display the set execution screen on the second display unit,
- detect a state in which an execution screen of a first application is displayed on the first display unit, and an execution screen of a second application is displayed on the second display unit,
- control, when a touch signal of a first touch applied to the execution screen of the first application is received, the execution screen of the first application by transmitting a first control signal corresponding to the touch signal of the first touch to the first display unit, and
- control, when a touch signal of a second touch applied to the execution screen of the second application is received, the execution screen displayed on the second display unit by transmitting a second control signal corresponding to the received touch signal of the second touch to the second display unit through the wireless communication unit and the wiring part, and wherein the first control signal and the second control signal are provided to the first display unit and the second display unit, respectively, via separate communication routes so that operations corresponding to the first and second control signals are performed simultaneously without affecting each other.

2. The electronic device of claim 1, wherein the first and second display units display different home screens when the first and second display units are switched to the active state, and wherein the first and second execution screens are displayed based on another touch input applied to each displayed home screen.

3. The electronic device of claim 1, wherein the control unit of the mobile terminal is configured to output notification information notifying that the first application is not allowed to be executed on the second display unit while maintaining a display state of the first display unit, in response to a detection of a request for an execution of the first application on the second display unit in a state in which the execution screen of the first application is displayed on the first display unit.

4. The electronic device of 1, wherein the control unit is configured to
- allocate different memory stacks for tasks of the respective execution screens displayed on the first and second display units, and
- control each memory stack to maintain the task of the execution screen of the second application displayed on the second display unit while changing the task of the execution screen of the first application according to the first control signal corresponding to the touch signal of the first touch.

5. The electronic device of claim 4, wherein the control unit of the mobile terminal is configured to
- recognize information selected on the execution screen of the first application according to the first touch, and display the recognized information by inserting the same in the input area displayed on the second display unit when the second touch is applied after the first touch to an input area included in the execution screen of the second application displayed on the second display unit.

6. The electronic device of claim 5, wherein a search result related to the recognized information is output to the second display unit in response to the recognized information being displayed on the input area displayed on the second display unit.

7. The electronic device of claim 1, wherein the control unit of the mobile terminal is configured to,
- when a selection of a specific wallpaper is detected while a third execution screen for setting a wallpaper is displayed on one of the first display unit and the second display unit, display the third execution screen setting information for applying the selected wallpaper to be expanded to another display unit on the third execution screen, and
- change wallpaper settings of the first and second display units, in response to an input to the setting information, so that the selected wallpaper is displayed across the first and second display units.

8. The electronic device of claim 7, wherein the control unit of the mobile terminal is configured to apply the selected wallpaper only to the one display unit when the selected wallpaper is not allowed to be expanded to the another display unit or the input to the setting information is negative.

9. The electronic device of claim 1, further comprising a connecting portion configured to allow the first body and the second body to rotate relative to each other, wherein the control unit of the mobile terminal is configured to determine whether to activate the second display unit and to display the execution screen of the application according to the stored setting information, according to a rotation angle of the connecting portion detected in the open state.

10. The electronic device of claim 1, wherein the first and second display units have one of a closed state in which the first display unit is covered by the second display unit and an open state in which the first display unit is not covered by the second display unit, and wherein the control unit of the mobile terminal is configured to control a display direction of at least one of the first and second display units to be rotated in a direction corresponding to a bent state when the first body and the second body relatively rotate toward the rear surface of the case in the open state so that the open state is switched from the open state to the bent state.

11. A method for controlling an electronic device including a mobile terminal and a case to which the mobile terminal is coupled, wherein the mobile terminal comprises a first display unit, and the case comprises a first body to accommodate the mobile terminal and a second body on which a second display unit is disposed, and wherein the first and second display units have one of a closed state in which the first display unit is covered by the second display unit and an open state in which the first display unit is not covered by the second display unit, the method comprising:

setting an execution screen in an initial state for the second display unit to store as setting information of the second display unit;

detecting that the closed state is switched to the open state according to a relative rotation of the first body and the second body, and switching the first display unit from an inactive state to an active state;

displaying a home screen on the first display unit when switched from the inactive state to the active state of the first body and the second body;

determining whether a touch input corresponds to a preset touch input applied to the second display unit, generating a control signal for switching the second display unit to the active state, transmitting the generated control signal to the second display unit with data associated with the stored setting information, and displaying the set execution screen on the second display unit;

detecting a state in which an execution screen of a first application is displayed on the first display unit, and an execution screen of a second application is displayed on the second display unit;

controlling, when a touch signal of a first touch applied to the execution screen of the first application is received, the execution screen of the first application by transmitting a first control signal corresponding to the touch signal of the first touch to the first display unit; and controlling, when a touch signal of a second touch applied to the execution screen of the second application is received, the execution screen displayed on the second display unit by transmitting a second control signal corresponding to the received touch signal of the second touch to the second display unit, wherein the first control signal and the second control signal are provided to the first display unit and the second display unit, respectively, via separate communication routes so that operations corresponding to the first and second control signals are performed simultaneously without affecting each other.

12. The method of claim 11, further comprising:

displaying a third execution screen for setting a wallpaper on either the first display unit or the second display unit;

displaying the third execution screen setting information for applying a selected specific wallpaper to be expanded to another display unit on the third execution screen when the selection of the specific wallpaper is detected; and displaying the selected wallpaper across the first and second display units based on an input to the setting information.

13. The method of claim 11, wherein the first control signal is directly transmitted from a control unit of the mobile terminal to the first display unit without using a wireless communication unit of the mobile terminal, and wherein the second control signal is transmitted from the control unit of the mobile terminal to the second display unit using the wireless communication unit of the mobile terminal.

14. The electronic device of claim 1, wherein the first control signal is directly transmitted from the control unit of the mobile terminal to the first display unit without using the wireless communication unit of the mobile terminal.

15. The electronic device of claim 1, wherein the execution screen of the first application and the execution screen of the second application are independently controlled by the control unit.

16. The electronic device of claim 1, wherein the control unit of the mobile terminal is further configured to, based on a request, control the execution screen of the first application displayed on the first display unit to display on the second display unit, or control the execution screen of the second application displayed on the second display unit to display on the first display unit.

* * * * *